US011926459B2

(12) United States Patent
Bodenmüller et al.

(10) Patent No.: US 11,926,459 B2
(45) Date of Patent: Mar. 12, 2024

(54) FOIL CARTRIDGE, SUPPORT SLEEVE AND CARTRIDGE SYSTEM

(71) Applicant: medmix Switzerland AG, Haag (CH)

(72) Inventors: Tobias Bodenmüller, Haag (CH); Marcel Richter, Haag (CH); Richard Lavelanet, Haag (CH)

(73) Assignee: MEDMIX SWITZERLAND AG, Haag (CH)

( * ) Notice: Subject to any disclaimer, the term of this patent is extended or adjusted under 35 U.S.C. 154(b) by 0 days.

(21) Appl. No.: 17/745,123

(22) Filed: May 16, 2022

(65) Prior Publication Data

US 2022/0274758 A1 Sep. 1, 2022

Related U.S. Application Data

(63) Continuation-in-part of application No. 17/631,789, filed as application No. PCT/EP2020/071214 on Jul. 28, 2020.

(30) Foreign Application Priority Data

Aug. 2, 2019 (EP) .................................... 19189791
Nov. 8, 2019 (EP) .................................... 19208043
Jul. 22, 2021 (DE) ........................ 202021103913.2

(51) Int. Cl.
*B65D 77/06* (2006.01)
*B05C 17/005* (2006.01)
(Continued)

(52) U.S. Cl.
CPC ........ *B65D 77/06* (2013.01); *B05C 17/00509* (2013.01); *B05C 17/00513* (2013.01);
(Continued)

(58) Field of Classification Search
CPC ................ B65D 77/06; B65D 83/0055; B65D 2577/041; B65D 83/0072;
(Continued)

(56) References Cited

U.S. PATENT DOCUMENTS 2,338,604 A * 1/1944 Silveyra ................. B65D 77/06 229/117.35
4,858,759 A 8/1989 Mauthe et al.
(Continued)

FOREIGN PATENT DOCUMENTS

DE 102007021454 A1 11/2008
EP 0144925 A2 6/1985
(Continued)

OTHER PUBLICATIONS

International Preliminary Report on Patentability dated Feb. 17, 2022 in corresponding International Application No. PCT/EP2020/071214.

*Primary Examiner* — Frederick C Nicolas
(74) *Attorney, Agent, or Firm* — GLOBAL IP COUNSELORS, LLP

(57) ABSTRACT

A foil cartridge Tillable with a fluid, includes a film bag cartridge forming a cartridge sleeve, and a solid head part including at least one outlet opening to dispense the fluid out of the foil cartridge and an external thread to attach the foil cartridge to a support sleeve. The film bag cartridge is attached to the head part in an area of the external thread.

19 Claims, 13 Drawing Sheets

(51) Int. Cl.
*B05C 17/015* (2006.01)
*B65D 83/00* (2006.01)

(52) U.S. Cl.
CPC ...... *B05C 17/00583* (2013.01); *B05C 17/015* (2013.01); *B65D 83/0055* (2013.01); *B65D 83/0072* (2013.01); *B65D 2577/041* (2013.01)

(58) Field of Classification Search
CPC ........ B05C 17/00509; B05C 17/00513; B05C 17/015; B05C 17/00583
See application file for complete search history.

(56) References Cited

U.S. PATENT DOCUMENTS

| | | | | |
|---|---|---|---|---|
| 5,301,842 | A * | 4/1994 | Ritter | B65D 81/325 222/548 |
| 6,176,394 | B1 * | 1/2001 | Shimko | B65D 75/5883 383/41 |
| 6,223,941 | B1 * | 5/2001 | Nealey | B05C 17/015 222/105 |
| 7,325,703 | B2 * | 2/2008 | Gherdan | A61J 1/035 222/541.9 |
| 7,445,135 | B2 * | 11/2008 | Miyata | B05C 17/00516 222/326 |
| 8,220,668 | B2 | 7/2012 | Cadden et al. | |
| 8,276,755 | B2 * | 10/2012 | Matsumura | B65D 83/0072 206/524.1 |
| 9,968,959 | B2 | 5/2018 | Frey | |
| 10,434,528 | B1 * | 10/2019 | Seiler | B05B 11/0081 |
| 10,906,702 | B2 * | 2/2021 | Seiler | B65D 35/242 |
| 11,518,603 | B2 * | 12/2022 | Seiler | B65D 81/325 |
| 2009/0065527 | A1 * | 3/2009 | Buck | G01F 11/026 222/105 |
| 2009/0084814 | A1 * | 4/2009 | Wisniewski | B65D 47/2031 222/536 |
| 2011/0108573 | A1 * | 5/2011 | Stoeckli | B01F 35/7131 222/137 |
| 2011/0138741 | A1 * | 6/2011 | Stoeckli | B01F 25/43141 53/167 |
| 2014/0124533 | A1 * | 5/2014 | Melia | B05C 17/00583 222/105 |
| 2016/0045928 | A1 * | 2/2016 | Frey | B05C 17/015 222/94 |

FOREIGN PATENT DOCUMENTS

| | | | |
|---|---|---|---|
| EP | 1266844 | B1 | 1/2007 |
| EP | 1284163 | B1 | 3/2008 |
| JP | 2000255656 | A | 9/2000 |

* cited by examiner

FOIL CARTRIDGE, SUPPORT SLEEVE AND CARTRIDGE SYSTEM

CROSS-REFERENCE TO RELATED APPLICATION

This application is a Continuation-In-Part of U.S. patent application Ser. No. 17/631,789, filed Jan. 31, 2022, which is a U.S. National Stage application of International Application No. PCT/EP2020/071214, filed Jul. 28, 2020, which claims priority to European Patent Application No. 19189791.7, filed Aug. 2, 2019, and European Patent Application No. 19208043.0, Nov. 8, 2019, the contents of each of which are hereby incorporated by reference. This application is also related to U.S. Design Application No. 29/823,900, filed Jan. 21, 2022 and U.S. Design application No. 29/823,896, filed Jan. 21, 2022, each of which are incorporated herein by reference.

BACKGROUND

Field of Invention

The disclosure relates to a foil cartridge Tillable with at least one fluid and composed of a film bag cartridge forming a cartridge sleeve and a solid head part. The disclosure further relates to a support sleeve for holding and/or supporting a foil cartridge according to the disclosure and a cartridge system with at least one foil cartridge according to the disclosure, a support sleeve according to the disclosure and a piston.

Background Information

Conventional cartridges can be filled, for example, with sealants or adhesives and used with a pistol-like one- or two-component mixing- or dispensing-system, respectively, in order to dispense the material contained therein. In some systems, such as the so-called side-by-side cartridge (double cartridge), the mixing or discharge system has a piston for each receiving unit of the cartridge filled with sealant or adhesive, wherein the piston is designed to dispense the sealant or the adhesive from the cartridge. So-called coaxial cartridges can also be used, in which only one piston is used to discharge the material contained therein, wherein in this case an outer cartridge surrounds an inner cartridge.

SUMMARY

It has been determined that in view of the growing demand for more sustainable devices, mixing or discharge systems are now often designed as reusable systems, so that only the cartridge has to be replaced when it has been completely emptied.

Lately, it has also been determined that so-called foil cartridges or film bag cartridges are used more and more as reusable cartridges. In contrast to conventional cartridges, which are produced entirely from plastic, foil cartridges can be designed at least partially as a foil or film. Known foil cartridges comprise a cartridge wall, which surrounds the cartridge chamber, is designed as a film or foil and is connected to a solid head part made of plastic, for example. Such an embodiment has various advantages. On the one hand, cartridges that have not yet been filled can be stored and transported better from the cartridge manufacturers to the manufacturers of the filling material (i.e. the adhesives, sealants, etc.), since foil cartridges require significantly less space when they are in a collapsed state. Upon filling the foil cartridge expands to its final size, which can be selected as desired.

On the other hand, foil cartridges are also significantly lighter than conventional cartridges made of plastic. This means that the foil cartridges are significantly smaller and lighter than conventional cartridges before and after use. In this way, the disposal costs can also be reduced significantly.

In any case, the ecological footprint of a foil cartridge is significantly better than the one of conventional cartridges made from plastic (e.g. by injection molding).

Compared to solid cartridges, foil cartridges have no inherent stability. Thus, if not further supported, foil cartridges would collapse during use. Therefore, in some systems (reusable) support sleeves are provided, which serve as a skeleton for the foil cartridges, so to speak, and give the cartridges the required stability.

Such support sleeves are usually made of metal and/or plastic in order to ensure that they can be used several times. In some systems, the head part of the film cartridge is usually clamped at a front end of the support sleeve to hold the film cartridge, such that the piston can press against the flexible cartridge wall from behind in order to empty it.

For this reason, the disclosure can provide a cartridge with which the replacement, respectively the attachment of the film bag cartridge to the support sleeve is simplified.

This advantage is satisfied by the foil cartridge, the support sleeve and the cartridge system described herein.

In particular, the disclosure provides a foil cartridge Tillable with at least one fluid and composed of a film bag cartridge forming a cartridge sleeve and a solid head part. The head part comprises at least one outlet opening for dispensing the fluid out of the foil cartridge and at least one external thread for attaching the foil cartridge to a support sleeve, wherein the film bag cartridge is attached to the head part in the area of the external thread.

Advantageous embodiments of the invention can be found in the description and the drawings.

According to an embodiment the film bag cartridge is attached to an outer side of the head part. The film bag cartridge can overlap the head part in a certain area such that it can be molded, glued or fixed in a different way to the head part.

According to an embodiment the film bag cartridge is attached to the head part such that the film bag cartridge covers the external thread, respectively being tightly fit to the external thread in a form-fitting manner. That is, the film bag cartridge can be tensioned such that it overlaps the outer thread without preventing the foil cartridge from being screwed to the support sleeve.

According to an alternative embodiment the film bag cartridge is attached to an inner side of the head part. It is also possible that the head part is equipped such that the film bag cartridge can be attached to the inner side of the head part.

According to an embodiment the film bag cartridge is glued to the head part.

According to an embodiment the head part is molded on to the film bag cartridge. In other words, regardless of whether the film bag cartridge is fixed to the inside or the outside of the head part, it can be injection-molded onto the head part.

Generally, the solid head part can be connected to the flexible film bag cartridge by gluing, shrinking or welding the one to another. A mechanical connection by a clip or a clamp—with or without a ring—is also imaginable.

According to an embodiment the film bag cartridge comprises at least one coating on its inner and/or outer side. For instance, it can be advantageous if the film bag cartridge comprises an anti-adhesive coating on the inside in order to be able to empty the film bag cartridge in the best possible way during use. In some cases it can also be possible that coatings are necessary such that the contents of the film bag cartridge do not react with the materials of the film bag cartridge itself.

According to an embodiment the film bag cartridge includes at least two layers, i.e. an inner and an outer layer. It should be noted that the inner layer is the innermost layer of the film bag cartridge and the outer layer is the outermost layer of the film bag cartridge. If further layers are arranged in between, they can be considered as intermediate layers.

According to an embodiment the at least two layers are made out of different materials. Thus, the film bag cartridge can be adapted optimally for its later use.

According to an embodiment each layer comprises a width in the range of 4 to 100 μm.

According to an embodiment the at least two layers comprise different widths. The exact width of each layer can vary depending on the application field and can be selected appropriately.

According to an embodiment at least one of the layers comprises aluminium.

According to an embodiment the at least two layers are connected to one another by at least one composite film. In particular, all layers present can be connected to one another by a composite film.

According to an embodiment the film bag cartridge comprises a third layer arranged between the inner layer and the outer layer.

According to another embodiment the third layer comprises aluminium.

In order to minimize the permeation, in particular the oxygen permeation and the water vapor permeation, of the film bag cartridge, the film bag cartridge comprises another layer arranged between the inner layer and the outer layer, comprising Ethylene vinyl alcohol copolymer (EVOH). This layer, which comprises or consists of ethylene-vinyl alcohol polymer, can be arranged between the inner layer and the outer layer. The layer with or made of ethylene-vinyl alcohol copolymer can preferably arranged directly adjacent to the outer layer and/or directly adjacent to the inner layer.

According to an embodiment the outer layer of the film bag cartridge is made out of the same material as the solid head part. This allows the outer layer to be connected to the solid head part in a simple manner by injection molding.

According to a further embodiment the inner layer of the film bag cartridge comprises a plastic, in particular a thermoplastic. This improves the recyclability of the film bag cartridge while at the same time simplifying the manufacture of the film bag cartridge.

According to an embodiment the inner layer of the film bag cartridge comprises the same material as the solid head part.

According to a further embodiment the inner layer and the outer layer of the film bag cartridge comprise the same material as the solid head part.

According to a further embodiment the inner layer is made of the same material as a part of the solid head part that is brought into connection with the film bag cartridge.

This makes it easier to connect the film bag cartridge to the solid head part by injection molding.

According to an embodiment the inner layer comprises a Shore D hardness in the range of 40 to 99, in particular of 40 to 60.

The inner layer of the film bag cartridge can, for example, be made of polyethylene, polypropylene, polyamide, polyethylene terephthalate or polybutylene terephthalate. The inner layer can further comprise, for example, polyamide in the form of PA-6 or PA-66. Polyamide has the advantage that it has a high mechanical stability and that the stability can be increased further by stretching. Polyethylene terephthalate (PET), on the other hand, is inexpensive and comprises a good chemical resistance.

According to a further embodiment the outer layer of the film bag cartridge comprises a plastic.

According to another embodiment the outer layer comprises a thermoplastic.

According to an embodiment the outer layer comprises a shore D hardness in the range of 40 to 99, in particular of 40 and 60.

Advantageously, the outer layer of the film bag cartridge is made of polyethylene, polypropylene, polyamide, polyethylene terephthalate or polybutylene terephthalate. The outer layer can, for example, comprise polyamide in the form of PA-6 or PA-66.

According to yet another embodiment the solid head part comprises a plastic.

In particular, the solid head part can comprise a thermoplastic.

Also, the solid head part can comprise a Shore D hardness in the range of 40 to 99, in particular of 40 to 60.

Advantageously, the solid head part is made of polyethylene, polypropylene, polyamide, polyethylene terephthalate or polybutylene terephthalate. The solid head part can, for example, comprise polyamide in the form of PA-6 or PA-66. Polyamide has the advantage that it comprises a high mechanical stability such that it is well suited for the solid head part. Polyethylene terephthalate (PET) could also be used for the solid head part as PET is easy to process and comprises a high chemical resistance.

According to an embodiment the solid head part is made of a polyethylene of high density (HDPE), wherein the polyethylene of high density comprises a density in the range of 930 $kg/m^3$ to 970 $kg/m^3$.

According to an embodiment the film bag cartridge is closed by a weld seam at a rear end remote from the solid head part. The shape of the rear end can, for example, be dome-shaped or conical. In general, the rear end of the film bag cartridge can taper continuously. Alternatively, the film bag cartridge can have a rear end that is essentially flat.

According to an embodiment the film bag cartridge is closed by a clip at a rear end remote from the solid head part. Such a clip can be made of plastic, for instance.

According to an embodiment the film bag cartridge is closed by an adhesive at a rear end remote from the solid head part.

According to an embodiment the film bag cartridge is stiff in a pulling direction. Thus, in the filled state, the film bag cartridge comprises a defined length and can therefore be introduced safely into a cartridge system.

Preferably, the film bag cartridge is configured to withstand a tensile load of 50 N to 80N in an axial direction. In other words, the film bag cartridge comprises a tensile strength in the axial direction of at least 50 N. This prevents the film bag cartridge from tearing due to tensile stress.

According to an embodiment the film bag cartridge comprises a puncture resistance in the range of 10 to 20 N. The puncture resistance can be determined using the standard DIN EN 14477, r=0.4 mm for pointed objects or using the standard ASTM F 1306 for blunt objects. For at least one of the two test standards the puncture resistance can lie in the range of 10 N to 20 N.

Preferably, the width of the inner layer is greater than the width of the outer layer. The inner layer can, for example, comprise a width that is 1.5 times greater than the width of the outer layer. The inner layer can preferably even have a width that is more than twice as great as the width of the outer layer.

According to an embodiment the inner layer comprises a minimum width of 50 μm to 90 μm. The inner layer can preferably even comprise a minimum width of 55 μm to 80 μm. The minimum width of the inner layer can be selected depending on the material used of the inner layer and the volume of the filling material.

According to an embodiment the film bag cartridge comprises a total material width in the range of 80 μm to 150 μm. The film width can be determined according to DIN EN ISO 4593. The film bag cartridge preferably comprises a total material width between 110 μm and 150 μm.

According to an embodiment the film bag cartridge comprises a total weight per unit area in the range of 100 $g/m^2$ to 170 $g/m^2$. The total weight per unit area can be determined according to DIN EN ISO 2286-2. The film bag cartridge can preferably comprise a total weight per unit area of 120 $g/m^2$ to 150 $g/m^2$.

According to an embodiment the film bag cartridge comprises a maximum water vapor permeation of 0.3 $g/(m^2 \times d)$.

Preferably, the film bag cartridge can comprise a maximum water vapor permeation of 0.2 $g/(m^2 \times d)$. The water vapor permeation is measured using the ISO 15106-3 standard (38° C./90% r.h.). The film bag cartridge preferably has a water vapor permeability which, according to the ISO 15106-3 standard (38° C./90% r.h.), is no longer in the measurable lower range, i.e. close to 0 $g/(m^2 \times d)$ According to a further embodiment the film bag cartridge comprises a maximum oxygen permeation of 0.3 $cm^3/(m^2 \times bar \times d)$.

Preferably, the film bag cartridge can comprise a maximum oxygen permeation of 0.2 $cm^3/(m^2 \times bar \times d)$. The oxygen permeation is measured using the ASTM D3985 standard (23° C./90% r.h.). The film bag cartridge preferably has an oxygen permeability which, according to the ASTM D3985 standard (23° C./90% r.h.) is no longer in the measurable lower range, i.e. close to 0 $cm^3/(m^2 \times bar \times d)$.

According to an embodiment the film bag cartridge comprises a wall thickness of at least 60 μm. The film bag cartridge preferably comprises a wall thickness or a film thickness of at least 80 μm. This can ensure that the film bag cartridge has sufficient mechanical properties.

According to an embodiment each layer of the film bag cartridge comprises a width of at least 4 μm, in particular of at least 5 μm. However, the bonding agents that can be present between the layers and that serve to connect the layers one to another are not regarded as a layer. The bonding agents that can be present between the layers can comprise a width of less than 5 μm. Bonding agents are preferably provided between layers made of different materials, which have a width of 5 μm or less.

According to an embodiment a bonding agent is arranged between at least two layers of the film bag cartridge, wherein the two layers are made of different materials. If the two layers are made of different materials, bonding agents can be advantageous since without such bonding agents layers made of different materials are difficult to connect to one another.

According to an embodiment the bonding agent comprises a layer width in the range of 1 μm to 5 μm. The width of the bonding agent should not be less than 1 μm as otherwise no or too little bonding agents could be applied in some places due to tolerance fluctuations. It has also been found that a width of more than 5 μm does not bring about any additional improvement to the adhesion of the different layers of the film bag cartridge.

In this connection it is noted that each layer of the film bag cartridge can comprise a width in the range of 4 μm and 100 μm. In particular, each layer of the film bag cartridge can comprise a width in the range of 5 μm to 70 μm. According to one embodiment, all layers of the film bag cartridge apart from the inner layer comprise a width in the range of 5 μm and 30 μm.

According to an embodiment the film bag cartridge comprises an essentially cylindrical outer shape. Additionally or alternatively the film bag cartridge comprises a weld seam in an axial direction. The weld seam can be designed as a fin seal. The weld seam can alternatively also be designed as an overlap seal.

According to an embodiment the weld seam is designed as a sealed edge seam or an overlap seam.

According to an embodiment the outer layer of the film bag cartridge is flatly connected to an inner wall of the head part. In other words, the outer layer of the film bag cartridge is not only connected to the inner wall of the head part by a line contact but over a width of at least 2 mm.

In the field of medical technology or for smaller jobs in the construction sector, it can be advantageous if the film bag cartridge comprises a volume in the range of 50 ml to 750 ml. The film bag cartridge can, for example, comprise a volume of 100 ml, 200 ml or 500 ml.

For other application, especially in the construction sector, it can be advantageous if the film bag cartridge comprises a volume in the range of 750 ml to 5000 ml, in particular 1000 ml, 1250 ml, 2500 ml or 4000 ml.

In order to avoid mix-ups of the cartridges and to find a simple manner with what the film bag cartridge is filled with, the film bag cartridge or the foil cartridge can comprise a marker on its outer side, respectively. This marker is preferably affixed to the film bag cartridge shortly before the film bag cartridge is filled or after the film bag cartridge has been filled. This helps minimizing errors in applying the right marker.

According to an embodiment the solid head part comprises one of more stiffening ribs at a side facing away from the film bag cartridge. The ribs can extend, for example, over the side of the solid head part facing away from the film bag cartridge. The ribs can be used to stabilize the area around the outlet opening to better absorb forces that are transferred to the head part during discharge and to prevent the head part from deforming.

In this connection it is noted that the one or more stiffening ribs are arranged in a circumferential direction.

Alternatively or additionally the stiffening ribs can also extend in a radial direction starting from a center axis of the film bag cartridge.

In any case, the stiffening ribs can increase the stability of the head part so that the head part withstands the pressures that arise when the fluid is pressed out of the head part.

According to an embodiment the head part is essentially dome-shaped, with in particular the stiffening ribs being arranged on the dome. A dome-shaped configuration has proven to be particularly advantageous for both visual and haptic reasons. In addition, the film bag cartridge can be emptied better through such a configuration.

According to an embodiment the head part comprises at least one wing. Such a wing can serve as a handle for the foil cartridge such that a user can easily screw the film bag cartridge onto the support sleeve.

The at least one wing can, for example, be arranged on the dome.

The wing can be bigger than at least one of the one or more stiffening ribs. This ensures that the user can operate the wings without the stiffening ribs getting in the way.

According to a further embodiment the wing comprises a height that is bigger than a height of at least one of the one or more stiffening ribs. That is, the wing can be higher than the stiffening ribs such that the user can easily grasp it.

According to an embodiment the wing comprises essentially the same width, in particular exactly the same width, as the one or more stiffening ribs. In this context, the term "essentially the same" is supposed to be understood in such a way that the width of the wing does not differ by more than +/−5% from the width of the stiffening ribs.

Especially embodiments with the widths of the wings and the stiffening ribs being exactly the same have proven to be particularly simple and inexpensive to manufacture.

According to an embodiment the head part comprises a web area arranged in a circumferential direction, which extends over a front end of the film bag cartridge facing the head part. Such a web can serve, for example, as a stop for the support sleeve when the support sleeve is connected to the head part.

According to an embodiment the outlet opening of the head part comprises an essentially constant cross section.

According the outlet opening comprises an inner thread to which an outlet nozzle can be attached to.

According to an alternative embodiment the outlet opening can comprise an outer thread to which an outlet nozzle can be attached to.

Outlet nozzles can be used to ensure a better and more precise dosing of the fluid that is stored inside the cartridge.

According to a further embodiment the outlet opening is closed by a membrane when the film bag cartridge is filled, with the membrane in particular being pierceable by the outlet nozzle. The main purpose of closing the outlet opening is that the foil cartridge can then be stored and transported without leaking. In particular, it can also happen that the fluid inside the cartridge reacts with oxygen such that it has be stored in a protective atmosphere. By closing the outlet opening with a membrane a reaction with oxygen can be avoided until the fluid is used.

According to an embodiment the outlet opening is arranged at a side of the dome of the head part facing away from the film bag cartridge.

According to a further embodiment the head part comprises an outlet area at which the outlet opening is arranged and which extends along the central axis of the film bag cartridge. In other words, the outlet opening can be arranged in a region of the head part which protrudes along the central axis. This allows the dosing of the fluid to be optimized. It can also make it easier to attach an additional outlet nozzle to the head part.

The outlet area can comprise an essentially tubular shape and comprises at least in some areas a wall thickness in the range of 0.5 mm to 1.5 mm. This way a good compromise between sufficient stability and material costs can be achieved.

The outlet area can also comprise a length in the range of 5 mm to 40 mm. In some embodiments the outlet area can comprise a length in the range of 20 to 30 mm. The outlet area should be as short as possible in order to be able to completely empty the foil cartridge. Nevertheless, it should be sufficiently long to being able to attach an outlet nozzle to it, for instance.

The invention further relates to a support sleeve for holding and/or supporting a foil cartridge according to the invention, wherein the support sleeve comprises an inner thread which corresponds with the outer thread of the foil cartridge.

According to an embodiment the support sleeve is made of metal, in particular aluminium, and/or plastic. Such materials enable a relatively quick and inexpensive manufacture while at the same time providing the desired rigidity of the support sleeve.

According to an embodiment the support sleeve is a single piece.

According to an alternative embodiment the support sleeve is made of several parts. For example, it can be possible to produce a front part and a rear part independently from one another. The front part and rear part can then be connected to form the support sleeve at a later point in time.

It is also possible that the support sleeve comprises at least one, in particular several, connection points to connect the different parts of the support sleeve to one another.

The at least one connection point can be designed as a thread, as a bayonet connection or as a click lock. This way, the various parts of the support sleeve can be detachably connected to one another.

According to an embodiment the support sleeve comprises an inner sleeve and an outer sleeve. The inner sleeve can be used, for example, to hold the outer sleeve. In addition, the film bag cartridge can be protected better by such a configuration.

According to an embodiment the inner sleeve is movably, in particular slidably, arranged inside the outer sleeve. For example, it can be possible that only the outer sleeve is connected to the head part while the inner sleeve only serves to protect the film bag cartridge.

According to a further embodiment the inner thread is a multi-start, in particular a two-start, thread.

The disclosure further relates to a cartridge system with at least one foil cartridge according to embodiments of the invention, a support sleeve according to the embodiments of invention and a piston, wherein the piston and the foil cartridge are arranged in a receiving area of the support sleeve, and wherein the foil cartridge is screwed via its outer thread to the inner thread of the support sleeve such that a part of the support sleeve covers a part of the head part of the foil cartridge. The support sleeve also comprises at least one radial pin, which is arranged at an end of the support sleeve remote to the head part for connecting the support sleeve to a dispenser.

According to an embodiment the at least one radial pin is mushroom-shaped. In particular, the radial pin can be mushroom-shaped in a side-view. Radial pins with a head part and a cylindrical part can be advantageous when, for example, the support sleeve has to be fixed to a dispenser since the special mushroom-like design can optimize the guidance of the radial pin in its corresponding recess.

In this connection it is also possible that the radial pin is configured to cooperate with corresponding counter parts, in particular recesses, at the dispenser such that the support sleeve is fastened, in particular releasably fastened, to the dispenser.

BRIEF DESCRIPTION OF THE DRAWINGS

The invention will be explained in more detail hereinafter with reference to the drawings.

DETAILED DESCRIPTION

Figure 1:
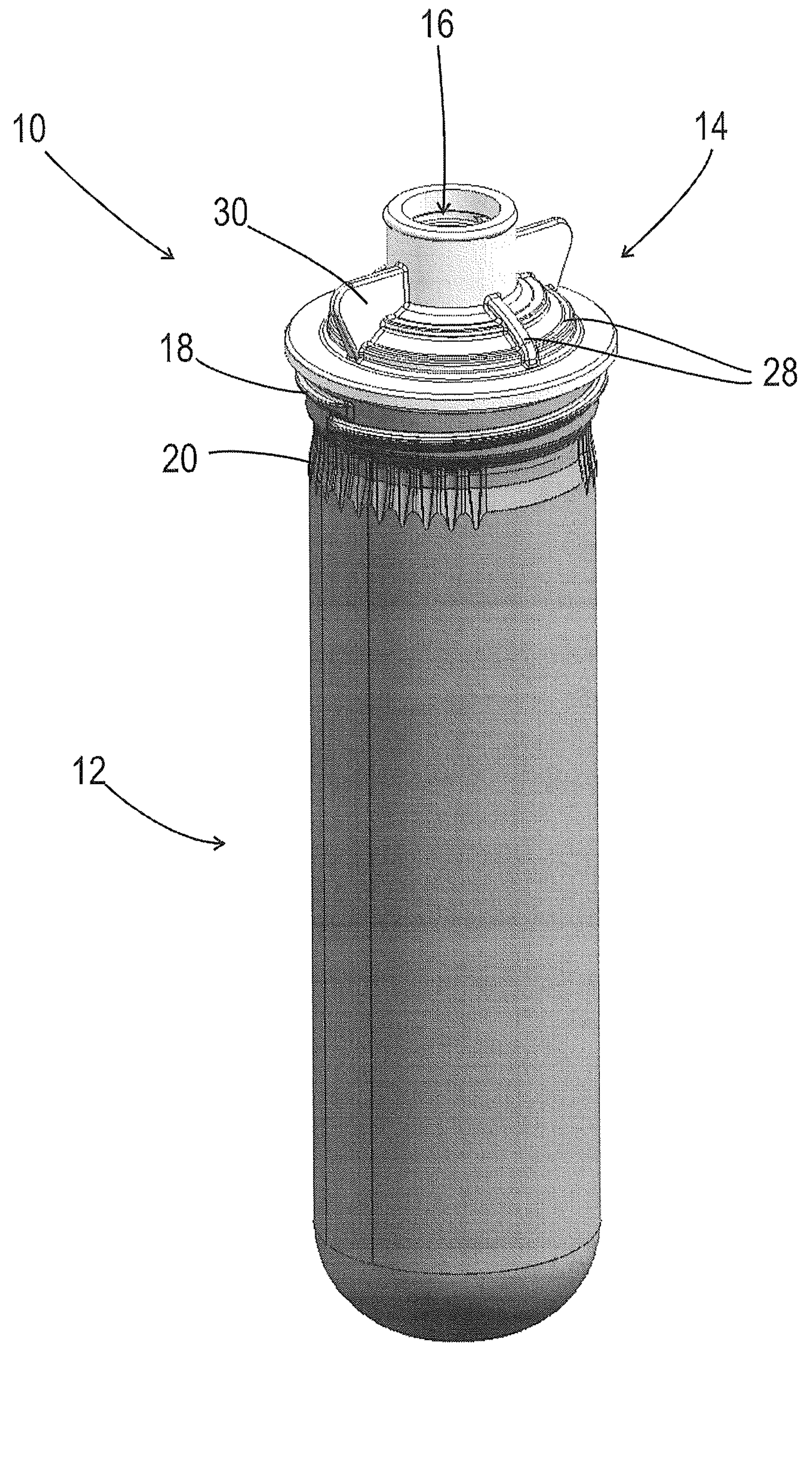
FIG. 1 is a perspective view of the foil cartridge according to the invention.

In the following the same reference numerals will be used for parts having the same or equivalent function. Any statements made having regard to the direction of a component are made relative to the position shown in the drawing and can naturally vary in the actual position of application.

FIG. 1 shows a foil cartridge 10 according to an embodiment of the invention which can be filled with at least one fluid. The foil cartridge 10 comprises a film bag cartridge 12 forming a cartridge sleeve and also a solid head part 14. The head part 14 has an outlet opening 16 through which the fluid can flow when the foil cartridge 10 is emptied. In addition, the head part 14 comprises an external thread 18 which is designed to interact with a corresponding internal thread 102 of a support sleeve 100 in order to thereby fasten the foil cartridge 10 to the support sleeve 100.

The film bag cartridge 12 can be attached to the head part 14 in two different ways. On the one hand, it is possible for the film bag cartridge 12 to surround the head part 14 from the outside, so that parts of the film bag cartridge surround the external thread 18 in a form-fitting way and, so to speak, envelops it (see FIG. 1). On the other hand, it is basically also possible that the film bag cartridge 12 contacts an inner surface (not shown) of the head part 14 and is, for example, glued or molded to the part of the head part 14.

Regardless of whether the film bag cartridge 12 is connected to the head part 14 on the outside or the inside, various methods of fastening are conceivable. The film bag cartridge 12 can, for example, be glued to the head part 14 or else be molded onto it. Other fastening methods are also conceivable.

In FIGS. 1 and 4 to 7, it can also be seen in particular that the film bag cartridge 12 is pleated 20 in the area where it is attached to the head part 14. This is—especially in the case of a film bag cartridge 12 which surrounds the external thread 18—often a sign for the film bag cartridge 12 being tensioned in this area such that a good seal between the film bag cartridge 12 and the head part 14 can be achieved.

Figure 8:
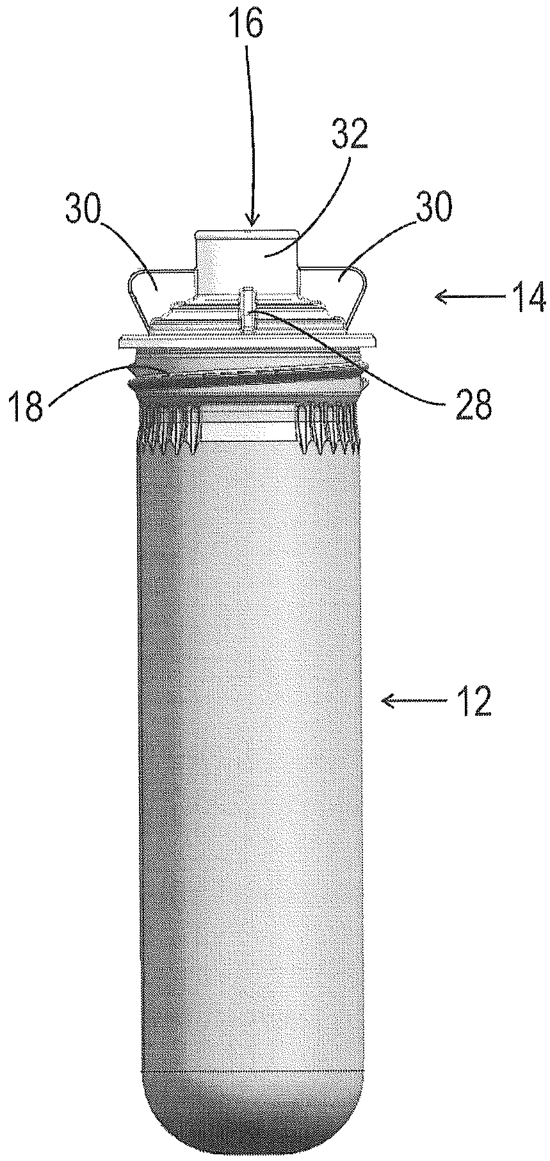
FIGS. 8 and 9 are side views of the foil cartridge according to the invention.
Figure 9:
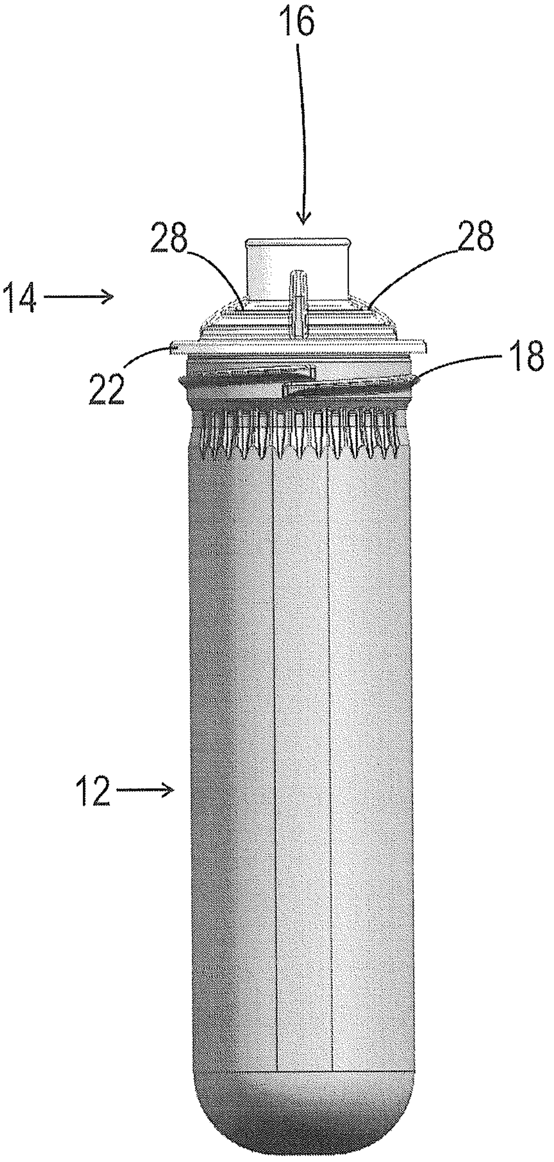
Figure 10:
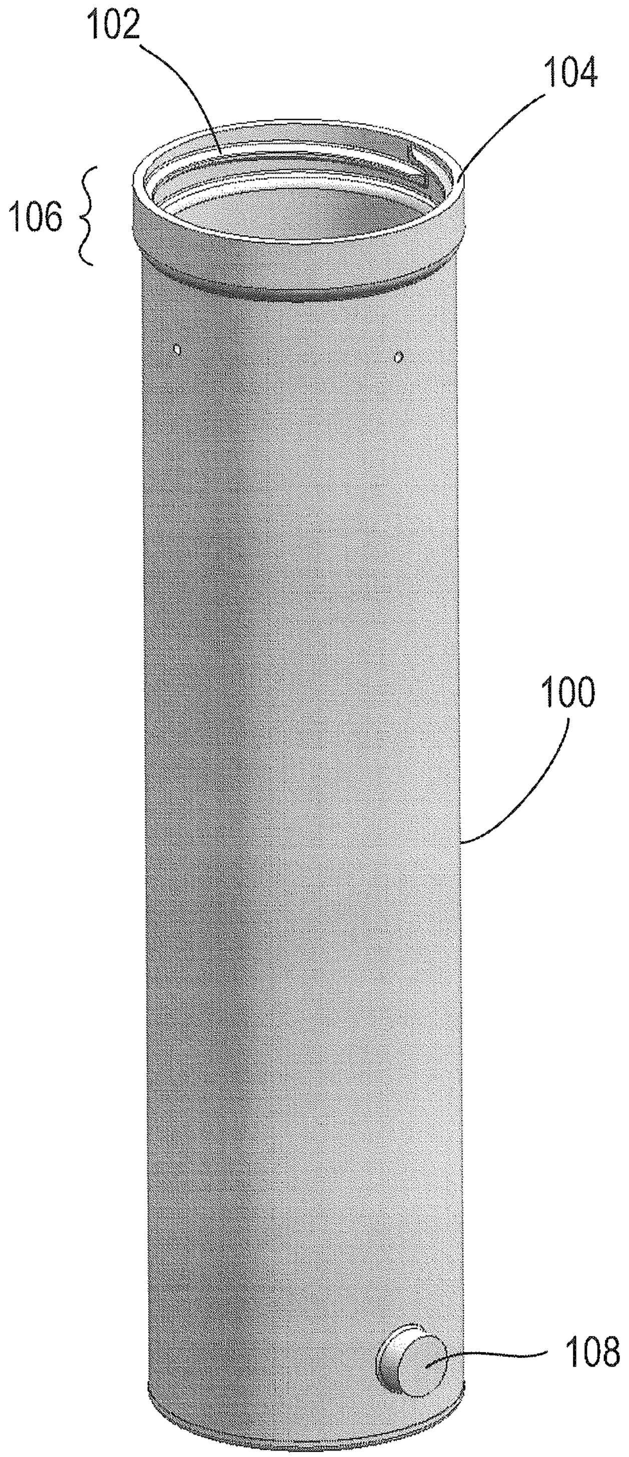
FIG. 10 is a perspective view of a support sleeve according to the invention.
Figure 11:
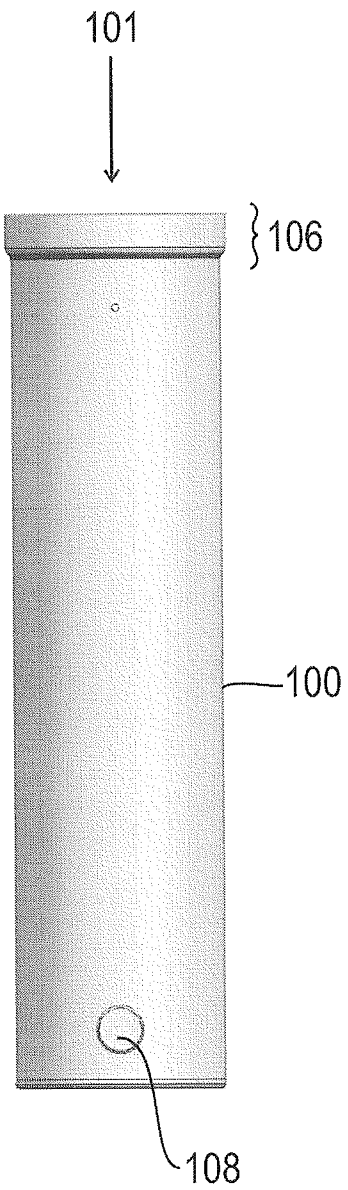
FIGS. 11 and 12 are side views of the support sleeve according to the invention.
Figure 12:
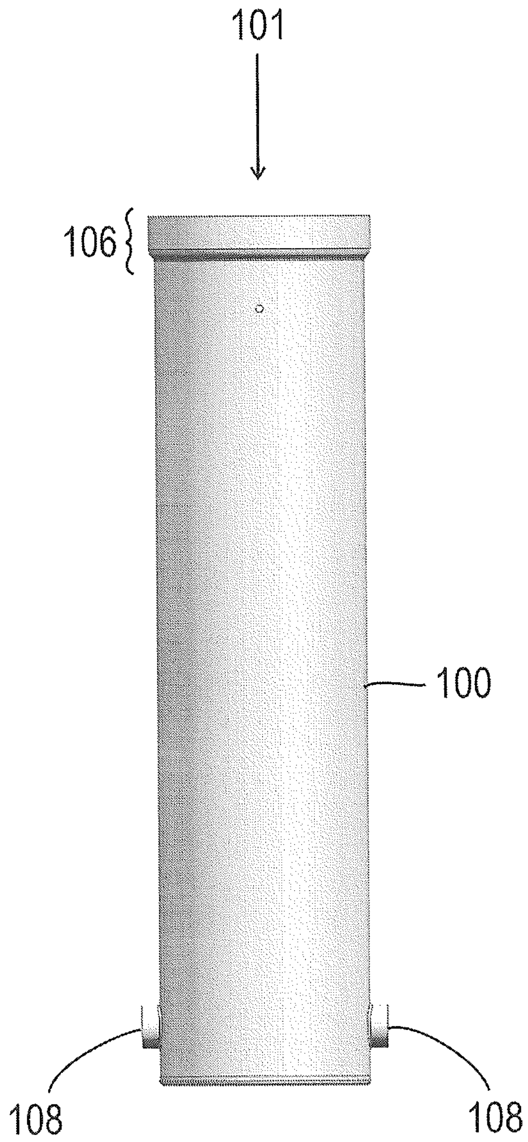
Figure 13:
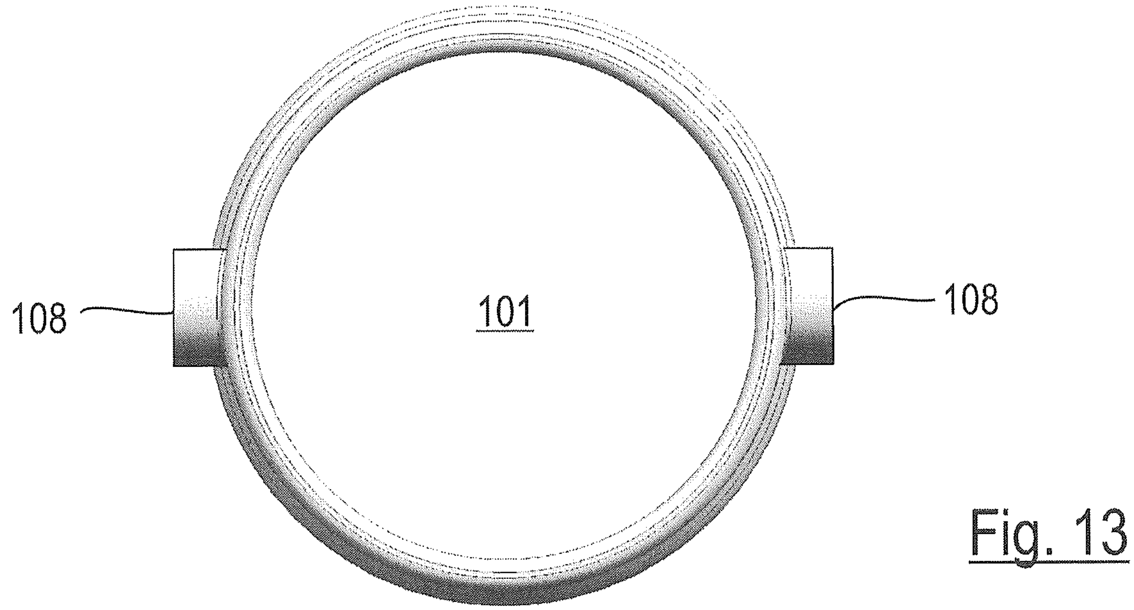
FIG. 13 is a view from below of the support sleeve of FIG. 10.
Figure 14:
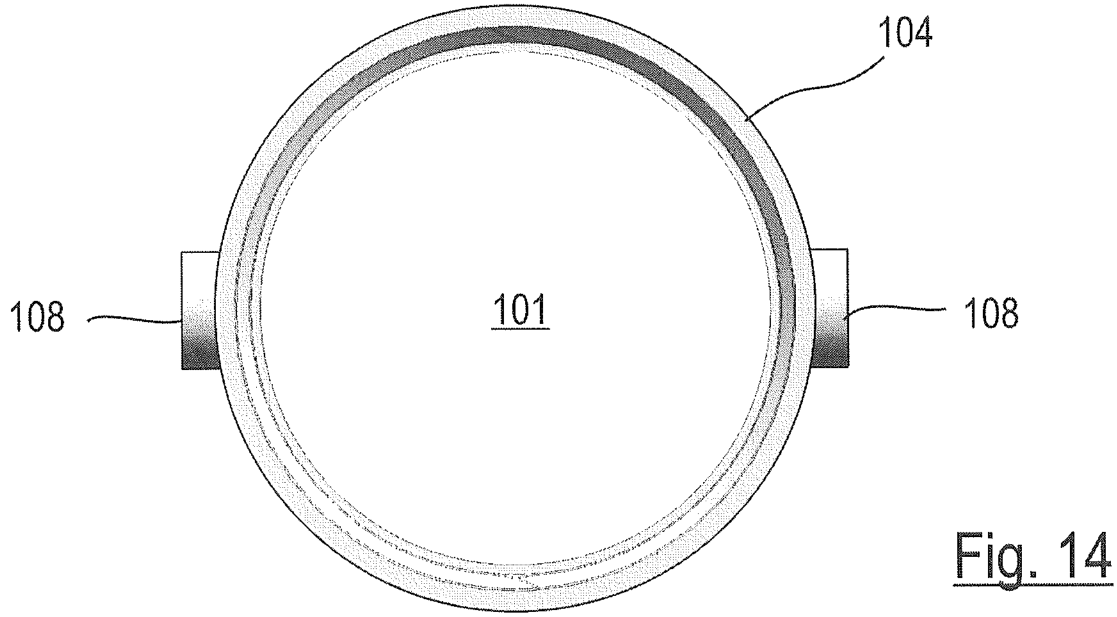
FIG. 14 is a top view of the support sleeve of FIG. 10.

As can be seen in FIGS. 1, 8 and 9, the film bag cartridge 12 comprises an essentially cylindrical shape. In this context it should be mentioned that the Figures show the film bag cartridge 12 in an expanded—that is, in a filled—state. Due to its flexibility, the film bag cartridge 12 can be folded or compressed in its empty state and thus can be made significantly smaller. This has proven to be particularly advantageous for the storage and transport of empty foil cartridges 10.

Figure 2:
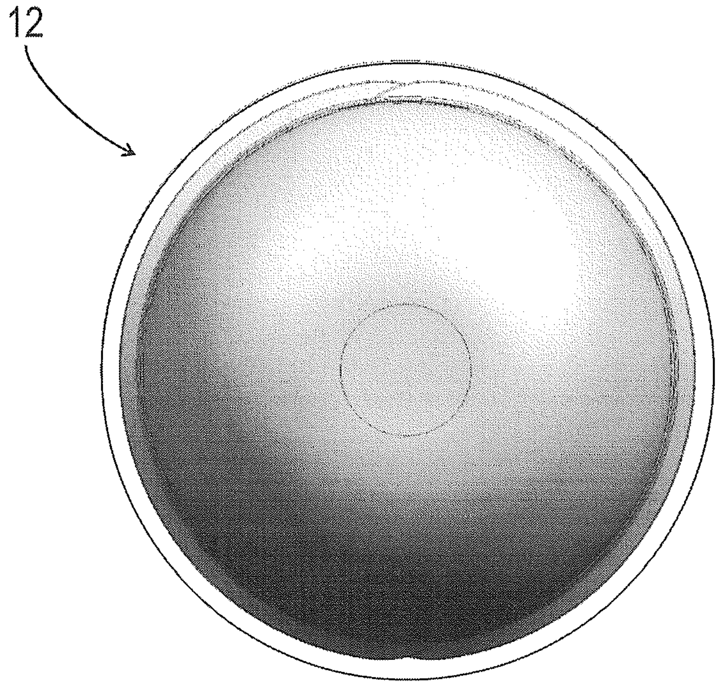
FIG. 2 is a view from below of the foil cartridge of FIG. 1.
Figure 3:
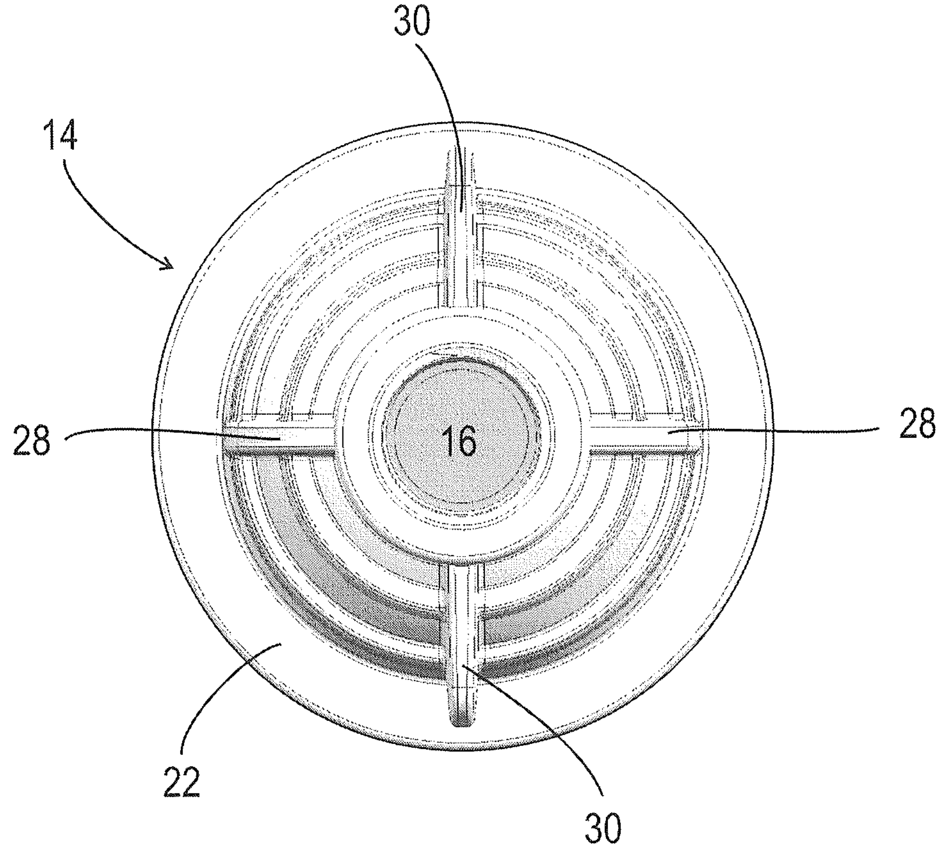
FIG. 3 is a top view of the foil cartridge of FIG. 1.
Figure 4:
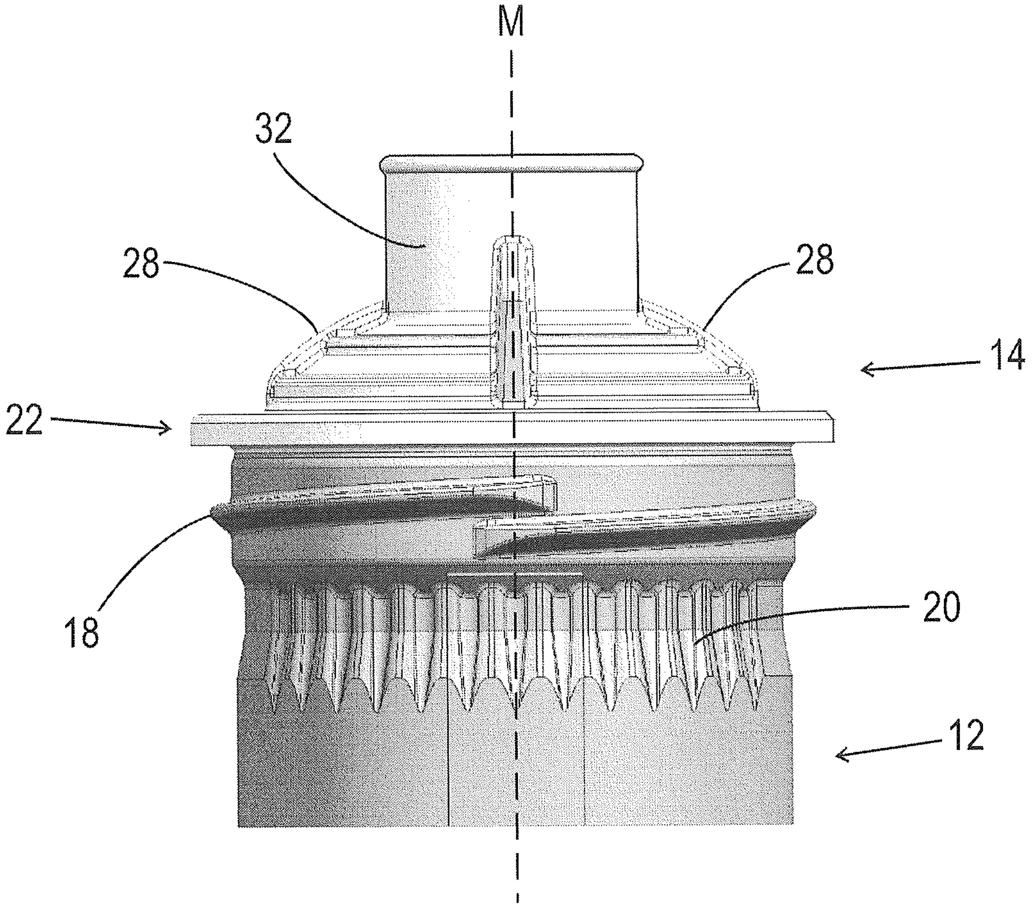
FIGS. 4 and 5 are side views of the head part.
Figure 5:
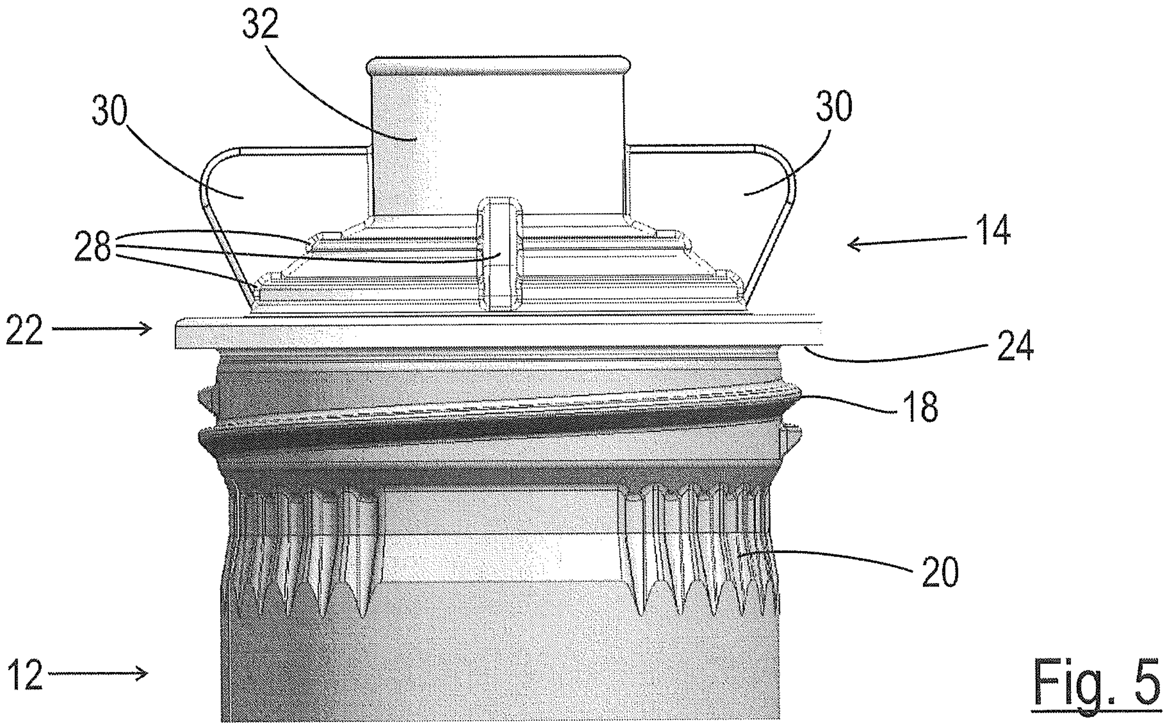
Figure 6:
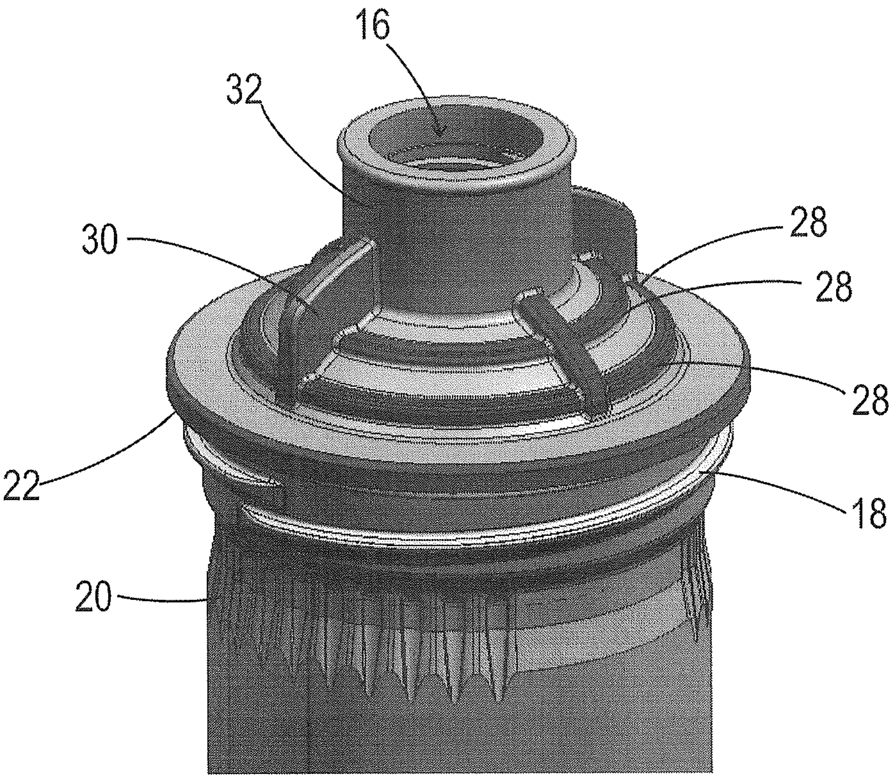
FIG. 6 is a perspective view of the head part.

The lower side of the film bag cartridge 12 (as seen from FIG. 1) can either be formed in one piece (see in particular the bottom view in FIG. 2) or it can also be closed by a seam, by an adhesive, clip or the like. This can be freely selected depending on the area of application and/or preferences.

In this connection it should also be mentioned that the film bag cartridge 12 can also have at least one seam along its longitudinal axis M along which it is closed.

It is also possible that the film bag cartridge 12 is formed from two or more layers, in particular an outer layer and an inner layer, which are connected to one another by a composite film or a bonding agent. However, this is not shown further in the figures, since it is already common knowledge how multi-layer film bag cartridges 12 can be produced.

The length and the diameter of the film bag cartridge 12 (and thus indirectly also of the head part 14) can be chosen to be suitable depending on the application. In principle, there are no limits.

In the following, the head part 14, which is shown in detail in FIGS. 3 to 7, will be discussed in more detail.

The head part 14 is made of a rigid material such as plastic and/or metal.

As already mentioned above, the head part 14 has an external thread 18 in the area where it is connected to the film bag cartridge 12, which serves to fix the foil cartridge 10 to an internal thread of a support sleeve 100. The support sleeve 100 will be discussed in greater detail below. The external thread 18 can be designed as a multi-start thread, in particular as a double-start thread.

Above the external thread 18, the head part 14 also comprises a web area 22 which extends once around the entire head part 14 in the circumferential direction. The web area 22 enlarges the diameter of the head part 14 to such an extent that it protrudes beyond the external thread 18 and thus serves as a stop 24 when the foil cartridge 10 is attached to the support sleeve 100. This can be clearly seen in FIG. 7.

Furthermore, the head part 14 has a dome-shaped bulge 26 which is formed on a side of the head part 14 facing away from the film bag cartridge 12. Since comparatively high pressures can act on the head part 14 when the foil cartridge 10 is emptied, a dome-shaped design has proven to be advantageous in order to be able to distribute the resulting pressure evenly over the surface of the head part 14. In addition, the film bag cartridge 12 can be emptied in a better way by such a configuration, since the fluid located therein thus always flows in the direction of the outlet opening 16 when pressure is exerted on the foil cartridge 10 from behind.

To further strengthen the head part 14, in particular in the area of the dome 26, several stiffening ribs 28 are formed. The stiffening ribs 28 can be arranged both in the circumferential direction and also radially, as can be seen in particular in FIGS. 1, 3 and 6. The stiffening ribs 28 serve in each case to intercept the pressure acting on the head part 14 and to distribute the pressure in a better way.

In the radial direction, starting from the outlet opening 16, two wings 30 are also arranged, which are designed to be actuated by a user in order to screw the foil cartridge 10 onto the support sleeve 100 or to remove it from the support sleeve 100. The wings 30 generally have a greater height, in particular a larger area, than, for example, the radially arranged stiffening ribs 28. As a result, the wings 30 protrude further from the head part 14 or the dome 26, so that a user can easily grasp and operate the wings 30.

In some embodiments, however, the wings 30 have the same or substantially the same width as the stiffening ribs 28. That is, the widths of the wings 30 and the stiffening ribs 28 do not differ from one another by more than 5%. Such a configuration has been particularly advantageous in terms of efficient and cost-effective manufacture.

The exact number of wings 30 and stiffening ribs 28 can be selected as required. In the embodiment of foil cartridges 10 with a larger total volume, it is thus possible, for example, for the head part 14 to have more stiffening ribs 28 than a foil cartridge 10 with a smaller volume.

In addition, an outlet region 32 is formed at the head part 14, which extends along a central axis M of the foil cartridge 10. This outlet region 32 has an internal thread 34 (see FIG. 7) to which, for example, an outlet nozzle (not shown) can be attached in order to ensure an exact dosing of the fluid. It can also be possible for the outlet area 32 to have an external thread to which such an outlet nozzle can be attached to.

The size or height of the outlet area 32 can be selected as desired and designed to be suitable depending on the field of application. It can again be possible for larger outlet nozzles to be attached to larger foil cartridges 10, for which a longer thread can be necessary than in the case of smaller designs.

In the embodiment shown, the outlet area 32 extends parallel to the central axis M. In principle, however, it is also possible that the outlet area 32 and thus also the outlet opening 16 is not arranged centrally on the head part 14, but at an angle to the central axis M. This can be particularly advantageous if the foil cartridge 10 is to be used dispensers which are suitable, for example, to get into corners and edges.

The wall thickness of the outlet area 32 can also vary or be selected freely. In most embodiments, however, it is selected to lie in a range of 0.5 to 1.5 mm.

In addition, it is also possible that the outlet area 32 or the outlet opening 16 is sealed with a membrane (not shown) for the storage or transport of the foil cartridges 10, which membrane can then, when required, be pierced and thus opened by, for example, attaching an outlet nozzle.

The support sleeve 100, which is shown by way of example in FIGS. 10 to 14, will now be discussed. In the exemplary embodiment shown, the support sleeve 100 is designed in one piece, which enables particularly simple and inexpensive manufacture.

In principle, however, it is also possible for the support sleeve 100 to consist, for example, of an inner sleeve and an outer sleeve.

In addition, it would also be conceivable that the support sleeve 100 is composed of several parts along the central axis M, which can be releasably connected to one another via connection points, for example in the form of screw-, click- or latching connections.

An internal thread 102 is disposed in an upper region of the support sleeve 100, which internal thread 102 is designed to be complementary to the external thread 18 of the foil cartridge 10. This means that the internal thread 102 of the support sleeve 100 is also designed as a multi-start, in particular two-start, thread.

Accordingly, the foil cartridge 10 can be received in a receiving area 101 of the support sleeve 100 and screwed to the internal thread 102 so that the support sleeve 102 protects at least the entire film bag cartridge 12 as well as parts of the head part 14.

Figure 7:
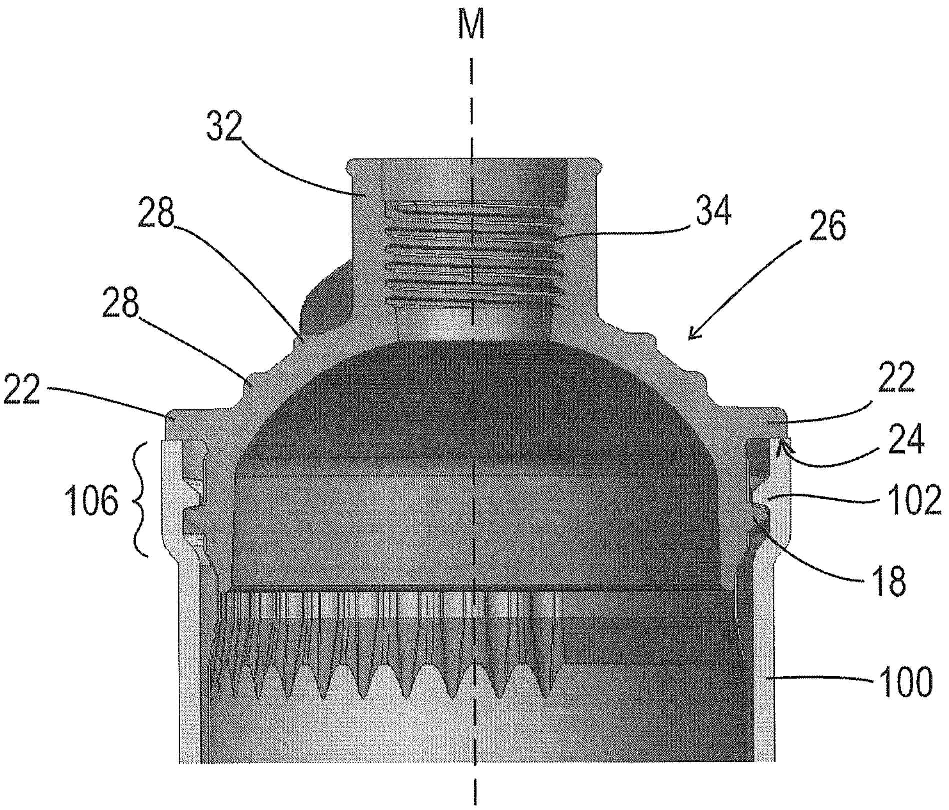
FIG. 7 is a sectional view of the head part.

The head part 14 of the film cartridge protrudes at least partially from the support sleeve, as can be clearly seen, for example, in the sectional view of FIG. 7, since its web area 22 rests on a front end surface 104 of the support sleeve 100.

The front region 106 of the support sleeve 100 can also have a larger diameter than the rest of the support sleeve 100, so that the head part 14 of the foil cartridge 10 can be accommodated therein.

Overall, the foil cartridge 10 comprises an essentially cylindrical shape so that its diameter along the central axis M hardly changes or does not change at all.

In principle, however, it is also possible that the shape of the support sleeve 100 is adapted to the shape of the film bag cartridge 12 and that the diameter, for example, to tapers slightly towards the bottom, i.e. the rear end, of the film bag cartridge 12.

At least one, in particular several, radial pins 108 are provided at a lower end of the support sleeve 100. These are designed to interact with corresponding recesses of a dispenser (not shown) in order to thereby fasten the support sleeve 100 together with the foil cartridge 10 to the dispenser.

The radial pins 108 can, as shown in the figures, can for example comprise a cylindrical shape. In other embodiments, they can also have a mushroom-shaped or round cross-section. The exact shape can be selected depending on the application or fixation method.

In order to use the foil cartridge 10, it is screwed to the support sleeve 100 via its head part 14, such that the film bag cartridge 12 is received in the receiving area 101 of the support sleeve 100. This system is then fixed to a dispenser (not shown) via the radial pins 108. Known dispensers generally include a piston which, when in use, presses against the film bag cartridge 12 from behind in order to compress it and subsequently empty it.

For this dispensing process, a thread 34 can additionally be provided at the front of the outlet opening 16 or at the receiving area 32 of the head part 14, to which an outlet nozzle (not shown) can be attached.

By providing a thread (external thread 18 or internal thread 102) for fastening the foil cartridge 10 to the support sleeve 100, simple and quick replacement of an empty foil cartridge 10 can be guaranteed. In addition, it is also possible to exchange the foil cartridge 10 without removing the support sleeve 100 from the dispenser (such as the one described in the following), since the foil cartridge 10 can be introduced into the receiving area 101 of the support sleeve 100 from the front.

FIGS. 15 to 23 show further embodiments of the foil cartridge 10 according to the invention. In particular, they show embodiments of a cartridge assembly 200 that includes a foil cartridge 10 according to the disclosure, a sleeve 202 that covers the foil cartridge 10 upon fixation to a dispenser 300 and a piston 204 configured to press against the film bag cartridge 12 in order to dispense the fluid contained therein.

Figure 15:
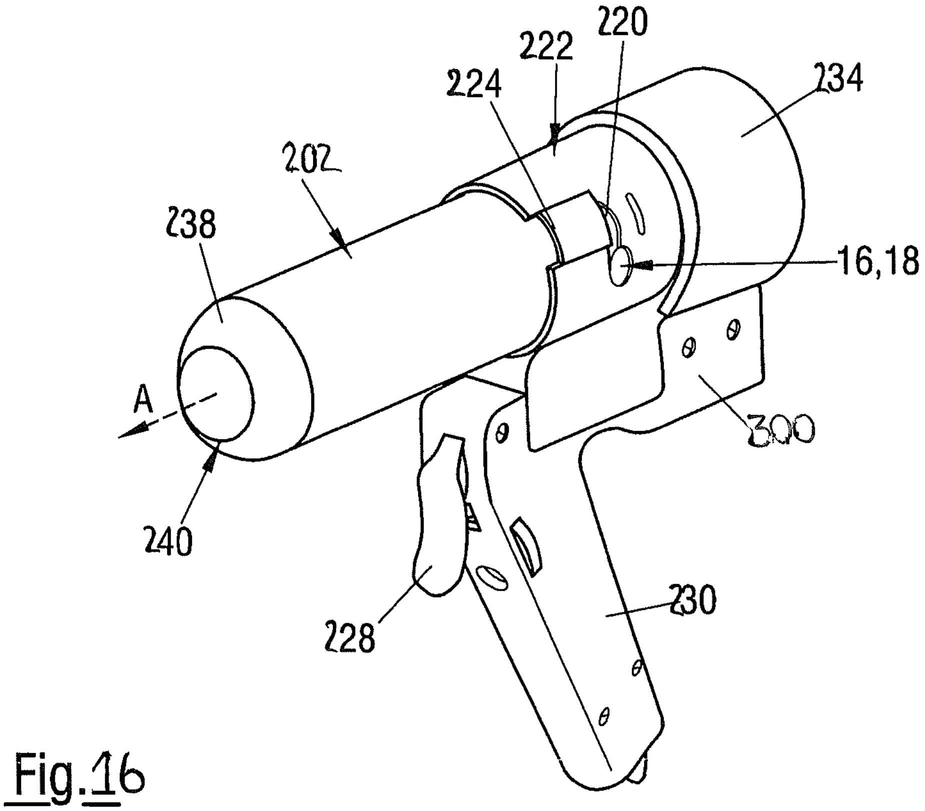
FIG. 15 is a perspective view of a sleeve of a cartridge assembly installed at a dispenser.

FIG. 15 shows a perspective view of a sleeve 202 of a cartridge assembly 200 (see FIG. 18) installed at a dispenser 300.

The sleeve is attached to the dispenser 300 via a bayonet type of connection 216. For this purpose, the sleeve comprises two radial pins 218 and the dispenser comprises two matching female at least generally L-shaped slots 220.

The sleeve 202 is in fact inserted into a cartridge receptacle 222 of the dispenser 300. The cartridge receptacle 222 comprises two bridges 224 bridging a respective one of the limbs of the L-shaped slot 220. A height of the bridge is selected such that it is larger than a height the respective radial pin 218 projecting from the sleeve 202 such that the sleeve can be inserted into the cartridge receptacle 222.

The dispenser 300 further comprises an actuation mechanism 226 (see FIG. 19) which is configured to act on a piston 204 via a push plate 266 and a plunger 232 of the dispenser 300 (see also FIG. 19) for dispensing materials stored in the cartridge assembly 200. In order to activate the actuation mechanism 226 a user pushes a trigger 28 present at a handle 230 of the dispenser 300.

Figure 19:
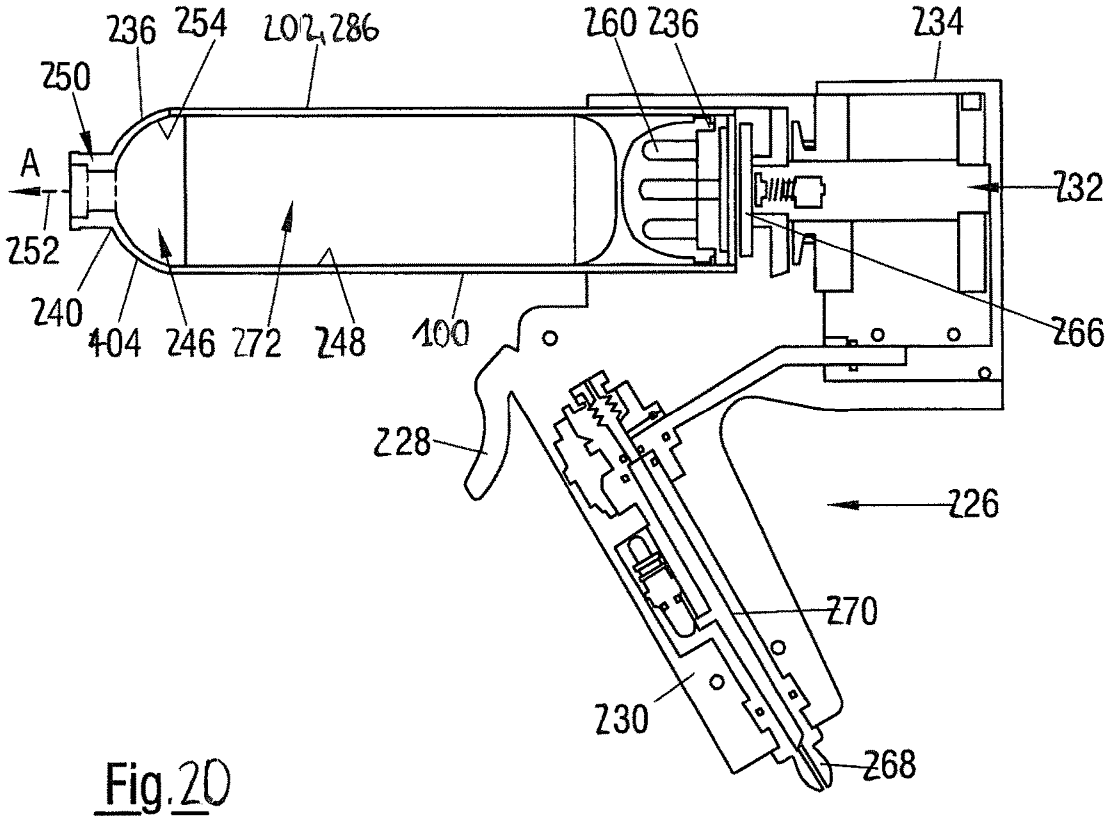
FIG. 19 is a sectional schematic view of the cartridge assembly of FIG. 18 installed in a dispenser.

As shown in FIG. 19, the push plate 266 and the plunger 232 are present in a rear end 234 of the dispenser 300. The rear end 234 is directly adjacent to the cartridge receptacle 222 such that the push plate 266 can be guided towards and into the sleeve 202 for moving the piston 204 along a longitudinal axis A of the dispenser 300 via the cartridge receptacle 222.

Figure 16:
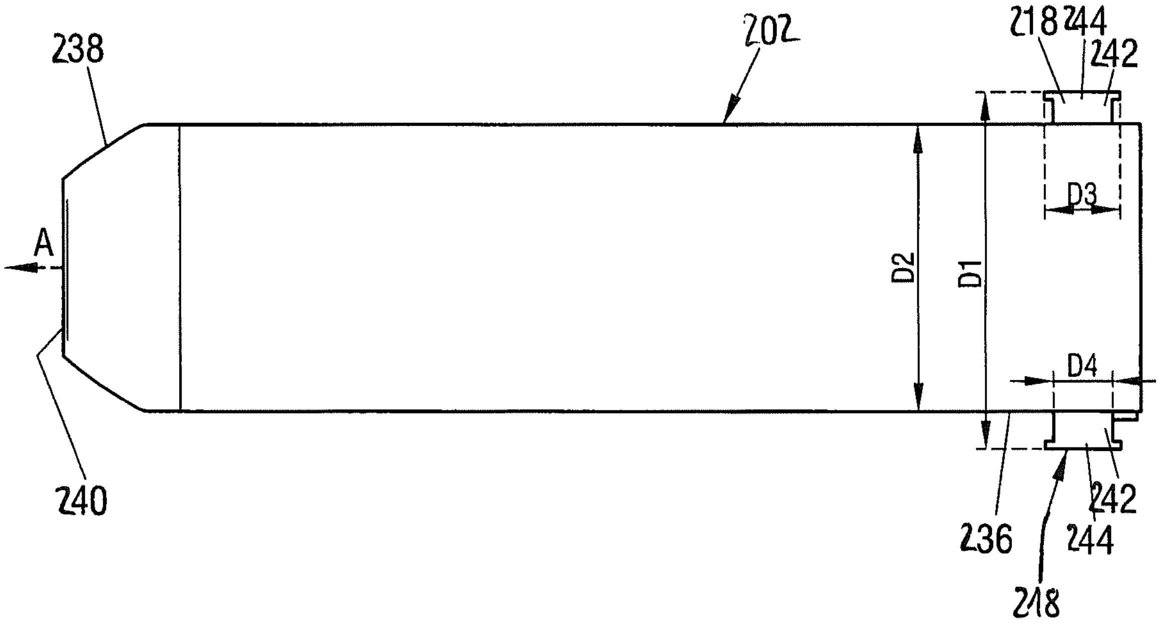
FIG. 16 is a sectional view of the sleeve of FIG. 15.

For this purpose, a back end 236 of the sleeve 202 is removably insertable into the cartridge receptacle 222. As shown in FIG. 16, the back end 236 comprises the radial pins 218 which in a sideview thereof comprise a cylindrical part 242 and a hat 244. Thereby the one or more radial pins 218 have the shape of a mushroom head in a sideview thereof. In this connection it should be noted that the bridges 224 are generally formed complementary in shape to the pins 218, in order to reliably guide the pins 218 in the slots 220.

The sleeve 202 has an outer diameter D1 at the radial pins of 55.4 mm. In this connection it should be noted that the outer diameter D1 can generally be selected in the range of 50 to 100 mm depending on the specific size of the cartridge assembly 200.

An outer diameter D2 at a region of the sleeve 202 directly adjacent to the radial pins 218 amounts to 45.4 mm. In this connection it should be noted that the outer diameter D2 of the sleeve 202 can generally be selected in the range of 40 to 95 mm.

A height of the pins 218 amounts to 5 mm. In this connection it should be noted that the height of the pins 218 can generally be selected in the range of 2.5 to 15 mm.

A diameter D3 of the hat 244 is 11.5 mm. In this connection it should be noted that the diameter D3 of the hat 244 can generally be selected in the range of 6.5 to 20 mm.

A diameter D4 of the cylindrical part 242 is 9 mm. In this connection it should be noted that the diameter D4 of the cylindrical part 242 can generally be selected in the range of 4 to 218 mm.

The sleeve 202 can be formed of a metal, such as stainless steel, aluminum or an aluminum alloy.

Alternatively, the sleeve 202 can be formed from a plastic, such as polyamide (PA), polypropylene (PP), or polyethylene terephthalate (PET), especially a plastic having a hardness measured on the Shore D scale selected in the range of 30 to 100. In this connection it should be noted that the PA, PP, or PET could be reinforced with natural fibers, such as wood and hemp.

Figure 17:
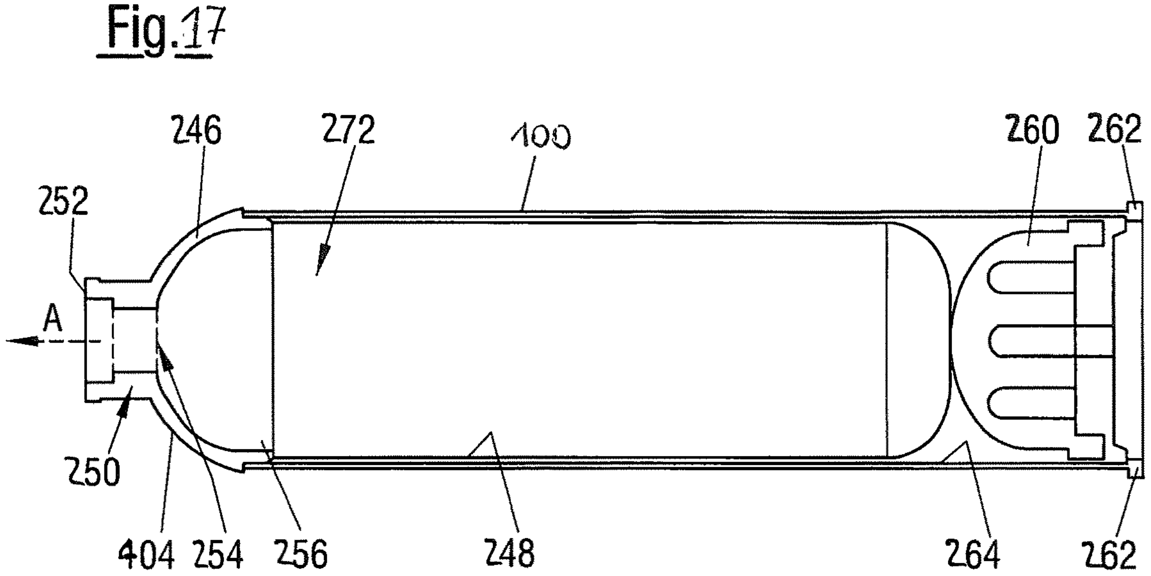
FIG. 17 is a sectional view similar to that of FIG. 16, with the film bag cartridge installed in the support sleeve.

As further shown in FIGS. 15 and 16 a front end 238 of the sleeve 202 comprises an aperture 240. The aperture 240 as shown e.g. in FIG. 17 is configured as an opening through which an outlet 250 having an outlet aperture 252 of the cartridge assembly 200 can be guided. The outlet 250 projects from the head part 14.

In this connection it should be noted that that the aperture 240 has a diameter which is larger than a maximum outer diameter of the outlet 250, preferably wherein a diameter of the aperture 240 is selected as being between 105% and 250% of the maximum outer diameter of the outlet 250.

More specifically, the outlet 250 is disposed at a solid head part 14 of the cartridge assembly 200, with a film bag cartridge 12 being integrally formed at the head part 14 to form a film bag cartridge 12.

In this connection the head part 14 can have a Shore D hardness selected in the range of 40 to 99. Preferably the Shore D hardness of the head part can lie in the range of 40 to 60.

The head part 14 and/or the sleeve 202 can comprise polyethylene (PE), high density polyethylene (HDPE), polypropylene (PP), polyamide (PA), polyethylenterephthalate (PET) or polybutylenterephthalate (PBT). The head part 14 can for example comprise polyamide in the form of PA-6 (perlon) or PA-66 (nylon). Polyamide has the advantage that it has a good mechanical stability and is thus suitable for the head part 14.

One can also consider forming at least one of the sleeve 202 and the head part 14 of a material that has been recycled, for example recycled by 100%, such as HDPE, green PE (e.g. made of sugar cane) and PP.

Alternatively, the material of the head part 14 and/or of the sleeve 202 can comprise a compound which is formed by a mixture of green PE with normal PE, a mixture of green PE and recycled PE, or a mixture of normal PE with green PE and recycled PE. Also compounds comprising recycled PP, partially recycled PP and/or normal PP can be used in injection molding processes of the head part 14 and/or as the material of the cartridge wall. The use of such recycled materials leads to a more environmentally friendly foil cartridge 10.

The head part 14 and/or the sleeve 202 can additionally be reinforced with further material such as through the use of fibers, such as natural fibers, wood fibers, cellulose fibers, hemp fibers, cork fibers, fibers from sun flower seeds, grass fibers, bamboo fibers, flax or carbon fibers.

By way of example, PP, TPE, TPS can each be injection molded together with cork fibers. PE, PP, PLA, PBS, and/or PBAT can be used in injection molding processes together with wood or natural fibers. PA, PE and/or PP can be injection molded together with a wide range of natural fibers. PP and/or PE can be injection molded together with fibers from sun flower seeds. PE, PP, and/or PLA can be injection molded together with fibers grass fibers, flax. It is also possible to injection mold thermoplastic materials not only with one kind of fiber but a mixture of types of fibers.

Similarly it is possible to coat the cartridge 10, i.e. the head part 14 or the film bag cartridge 12 on the inside and/or on the outside with layers designed to improve the chemical capability of the cartridges, for example, to provide coatings that do not react with the contents stored in the cartridge 10, but which contents might react with materials of the cartridge walls, i.e. the film bag cartridge 12, or the head part 14.

Similarly, the coating materials could seal off the material of the head part 14 and/or of the film bag cartridge 12 in order to improve the long-term storage stability of the cartridge 10.

Using such coatings, the material of the head part 14 and/or of the film bag cartridge 12 forming the cartridge 10 does not inherently have to be suitable for the materials stored in the cartridge 10, i.e. one can manufacture a cost-effective cartridge 10 and subsequently coat this to make the cartridge 10 suitable for its then intended use.

Polyethylenterephthalats (PET) can also be used for the head part 14. PET can namely be processed in a facile manner and has a good chemical resistance.

In accordance with an embodiment the head part 14 is made of a high density PE (HDPE). High density polyethylene (HDPE) has a density in the range of 930 $kg/m^3$ to 970 $kg/m^3$ auf.

The film forming the film bag cartridge 12 can be a multilayer film having at least two layers formed from different materials. Alternatively, the film forming the film bag cartridge 12 can be a single layer film made of a single material.

For example, the film could be a three-layer film comprising a sandwich structure in which the first layer is formed of polyethylene (PE) (20 to 40 μm thickness), which is connected to a second layer of aluminum (Al) or of an aluminum alloy (Al alloy) (7 to 12 μm thickness) via a tie layer (1.5 to 2.5 μm thickness). The Al or AL alloy layer is in turn connected to a third PET layer (12 to 15 μm thickness) via a further tie layer (1.5 to 2.5 μm thickness).

For example, the film could be a four-layer film comprising a sandwich structure in which the first layer is formed of PE (20 to 40 μm thickness), which is connected to a second layer of aluminum (Al) or of an aluminum alloy (Al alloy) (7 to 12 μm thickness) via a tie layer (1.5 to 2.5 μm thickness). The Al or AL alloy layer is in turn connected to a third layer of PA (10 to 20 μm thickness) via a tie layer (1.5 to 2.5 μm thickness). The third layer of PA is in turn connected to a fourth layer of PE (15 to 30 μm thickness) via a further tie layer (1.5 to 2.5 μm thickness).

For example, the film could be a five-layer film comprising a sandwich structure in which the outer layer is formed of PE (20 to 40 μm thickness) which is connected to a layer of PA (10 to 20 μm) via a tie layer (1.5 to 2.5 μm). The PA layer in turn is connected via a further tie layer (1.5 to 2.5 μm) to an aluminum or aluminum alloy layer (5 to 10 μm). The aluminum or aluminum alloy layer is in turn connected to a further PA layer (10 to 20 μm) via a further tie layer (1.5 to 2.5 μm) which is then connected to an inner layer corresponding to the inner surface 242, via a via a further tie layer (1.5 to 2.5 μm) with the inner layer having a thickness selected in the range of 45 to 100 μm.

It should be noted that the respective tie layers are not considered to be individual layers of a multi-layered film, they are merely present to ensure a bond is formed between the individual layers.

The materials of the film can differ from the above mentioned materials as can their respective thicknesses. It should be noted in this connection that the multi-layered films typically have a thickness selected in the range of 40 to 200 μm, in particular of 50 to 170 μm.

A further film (not shown) can be provided at an inner surface 254 of the head part 14, with the same or a similar film to the film of the film bag cartridge 12 being selected as a material of the further film.

In this connection it should be noted that for so-called front filling operations, the further film covers the inner surface of the head part 14, but does not seal off the passage of the outlet 250, such that the material can be filled into the cartridge 10 via the outlet 250.

Alternatively, the further film can be arranged to cover a passage of the outlet 250, in these instances the cartridge 10 would typically be filled with material using the so-called back filling procedure in which the film bag cartridge 12 is open at its end opposite the head part 14 and the initially open end is sealed off after the filling procedure has been completed.

The film bag cartridge 12 is attached to a collar 256 of the head part 14. The collar 256 can have an outer diameter which is slightly smaller than the maximum outer diameter of the head part 14.

As shown in FIG. 17 the film bag cartridge 12 and the head part 14 are received in a support sleeve 100, as is the piston 204. The piston is moveable to and fro along an inner surface 264 of the support sleeve 100.

A first end of the support sleeve 100 remote from the outlet 250 comprises a radially projecting abutment 262. The radial abutment 262 is configured as an end of the back end 236 of the sleeve 202 shown in FIG. 18 and projects as high as the outer diameter D2 of the outer sleeve 286 of the sleeve 202 shown in FIG. 18. The inner support sleeve 258 is slideably mounted within the outer sleeve 286 in order to permit a releasably assembly of the two components.

The sleeve 202 is thus of multi-part design. In this connection it should be noted that the support sleeve 100 can be formed of a plastic, such as a plastic described in the foregoing in relation to the materials of the head part 14. Specifically, the plastic of the support sleeve 100 can have a Shore D hardness selected in the range of 40 to 99. Preferably the Shore D hardness of the support sleeve can lie in the range of 40 to 60. The material of the outer sleeve 286 can then be selected as either the same plastic, a different plastic or a metal, such as aluminum, an aluminum alloy or stainless steel.

The inner support sleeve 100 can house the cartridge wall attached to the collar 256 of the head part 14, i.e. the inner support sleeve 100 covers the cartridge wall forming the film bag cartridge 12 in the region in which it is attached to the collar 256 in order to protect the film bag cartridge 12 in the region of the collar 256. This ensures a secure and reliable connection of the support sleeve 100 at the head part 14.

More specifically, a second end of the inner support sleeve 100 directly adjacent to the head part 14 and disposed opposite to the first end is connected to the collar 256 of the head part 14.

The provision of two or more cartridges 10 in a support sleeve 100 means that the time between changes of the cartridges 10 in a cartridge assembly 200 can be significantly reduced, which particularly for time sensitive applications, means that the cartridge 10 can be replaced quickly within the outer sleeve 286.

Figure 18:
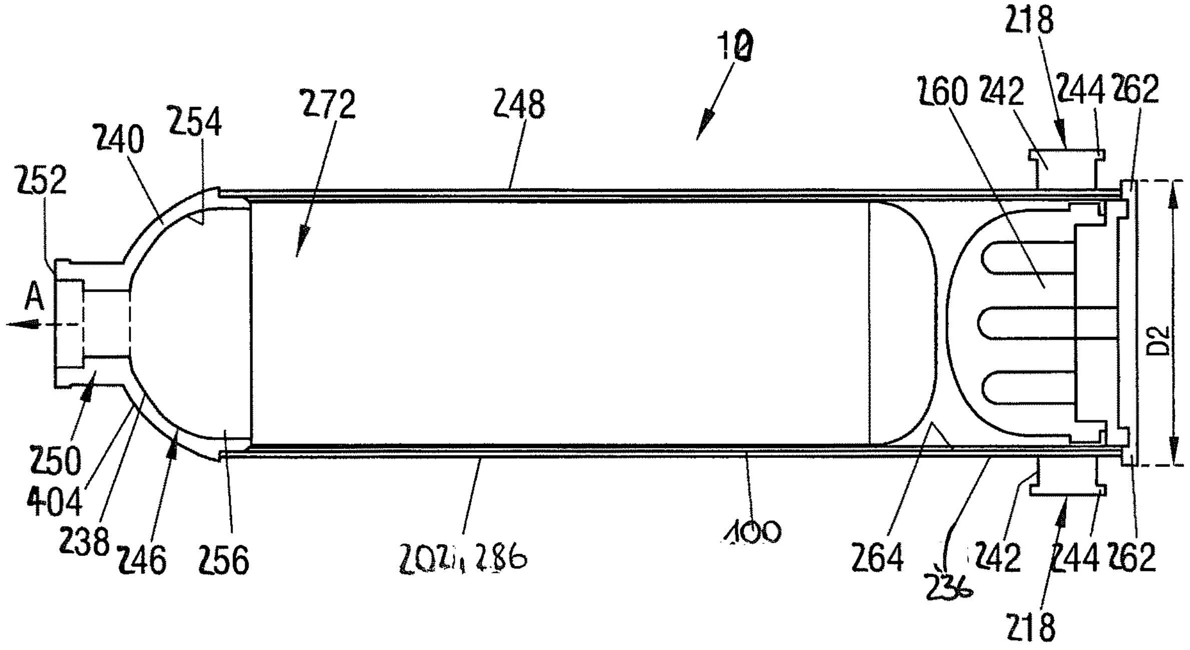
FIG. 18 is a sectional view of a cartridge assembly, with the film bag cartridge installed in the support sleeve of FIG. 17 installed in the sleeve of FIG. 16.

FIG. 18 shows a sectional view of the cartridge assembly 200, with a film bag cartridge 12 comprising the head part 14 and the film bag cartridge 12 installed in the support sleeve 100 of FIG. 17 installed in the sleeve 202, 286 of FIG. 16.

In this connection it should be noted that the inner support sleeve 100 can have a length selected in the range of 5 to 50 cm, in particular in the range of 10 to 40 cm and especially in the range of 12 to 20 cm.

It should further be noted that the inner support sleeve 100 can have a thickness selected in the range of 0.05 to 7 mm, in particular in the range of 0.25 to 3 mm and especially in the range of 0.5 to 2.5 mm.

In this connection it should be noted that the outer sleeve 286 can have a length selected in the range of 5 to 50 cm, in particular in the range of 10 to 40 cm and especially in the range of 12 to 20 cm.

It should further be noted that the outer sleeve 286 can have a thickness selected in the range of 0.05 to 7 mm, in particular in the range of 0.25 to 3 mm and especially in the range of 0.5 to 2.5 mm.

FIG. 19 shows a sectional schematic view of the cartridge assembly 200 of FIG. 18 installed in the dispenser 300. The dispenser 300 is a pneumatic dispenser having an air-line connector 268 for providing pressurizing air to the actuation mechanism 226 which has an air channel 270 therein for supplying pressurized air to the push plate 266 arranged at the back end 234 of the dispenser 300 for the purpose of dispensing. Such a system can reliably be used to dispense the materials M from the dispenser 300 in a fast and reliable manner. For this purpose, a not shown nozzle can be connected to the outlet 250.

In this connection it should be noted that the nozzle can be connected to the outlet 250 by one of a threaded connection, a bayonet type connection or the like, with an inner and/or outer thread being present at the outlet 250 by way of example in dependence on the type of nozzle used.

In this connection it should be noted that the actuation mechanism 226 could also be formed by a manually operated mechanical actuation mechanism 226, a hydraulically driven actuation mechanism 226 and an electrically driven actuation mechanism 226.

Figure 20:
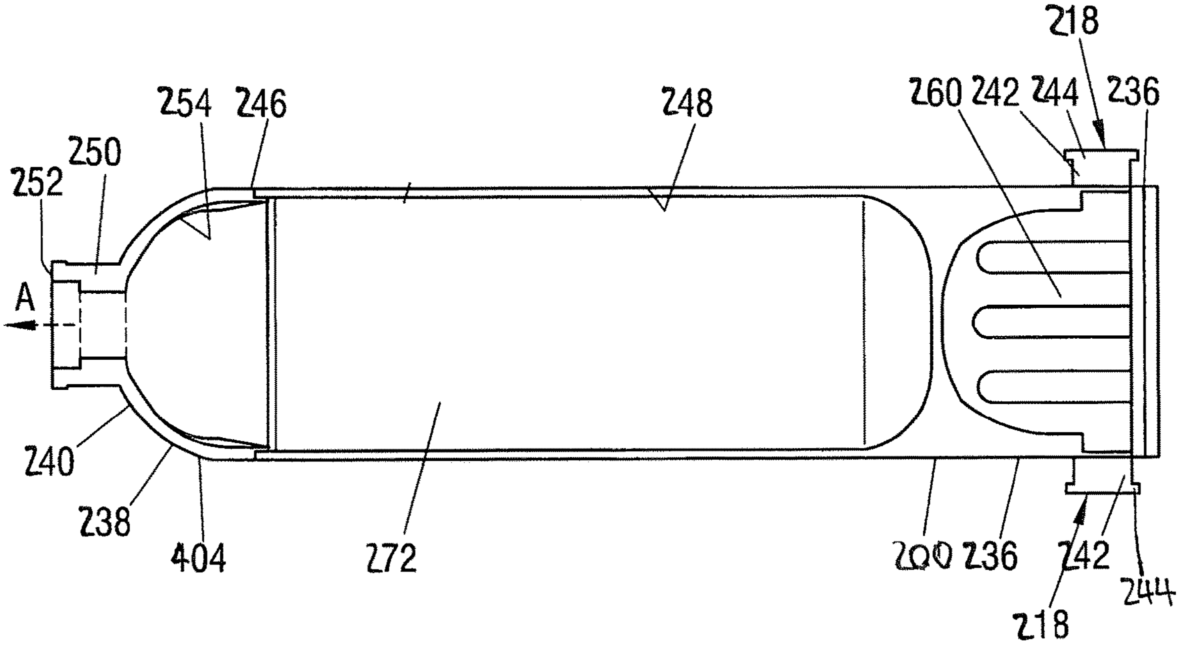
FIG. 20 is a sectional view of a further cartridge assembly.

FIG. 20 shows a sectional view of a further cartridge assembly 200. The cartridge 10 like the cartridge shown in the other Figures is a single component cartridge 10. The difference to the example shown in FIGS. 15 to 19 is that the sleeve 202 is of single part design and does not comprise a support sleeve 258.

Figure 21:
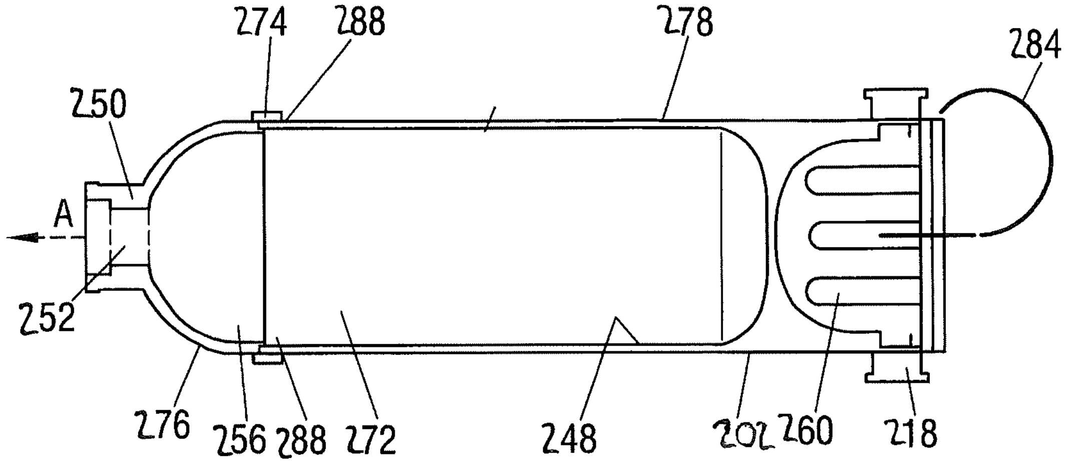
FIG. 21 is a sectional view of a further cartridge assembly.

FIG. 21 shows a sectional view of a further cartridge assembly 200. In order to connect the front part 276 of the sleeve to the rear part 278 of the sleeve there is provided a threaded connection 274. In the examples shown in FIGS. 21 to 23 an inner thread 280 is present at the front part 276 and an outer thread 282 is present at the rear part 278. It should be noted in this connection that the outer thread 282 could also be present at the front part 276 and the inner thread 280 could then consequently be present at the rear part 278

In order to avoid the piston 204 from becoming lost on assembling the cartridge assembly 200, the sleeve 202 can comprises one or more retraction and/or catch mechanisms for the piston 204.

For example, the sleeve 202 can comprise a cord 284 via which the sleeve 202 is connected to the piston 204 as indicated in FIG. 21. Such a cord 284 can be present at any of the sleeves 202 shown in this description. This cord 284 enables the piston 204 to be held at the sleeve 202 with which it is associated.

The cord 284 also enables a user to retract the piston 204 from a forward position in which the piston 204 is closer to the head part 14 than it is to the back end 236, such that one can place a new cartridge 10 within the sleeve 202.

Figure 22:
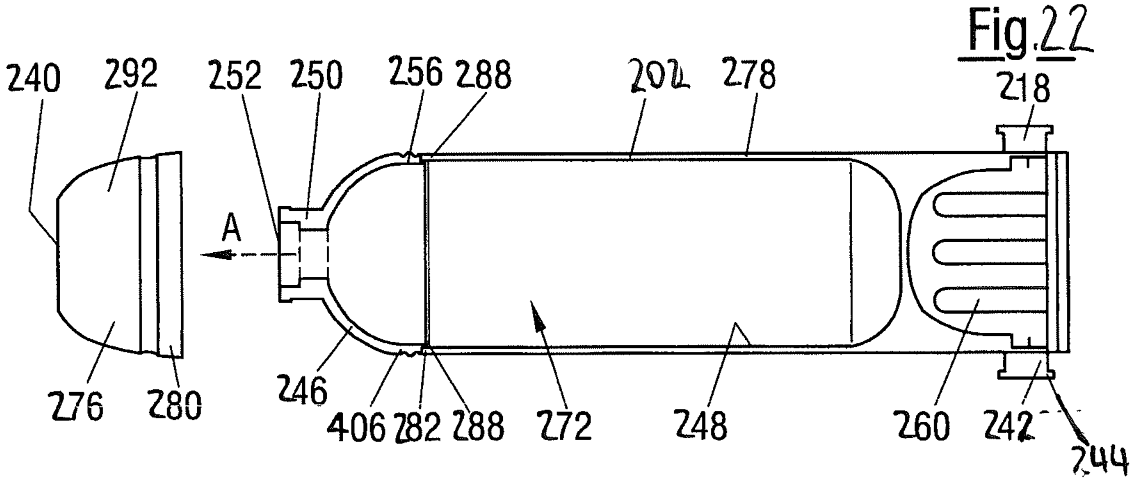
FIG. 22 is a sectional view of the further cartridge assembly of FIG. 21, with a screw cap removed from the sleeve.
Figure 23:
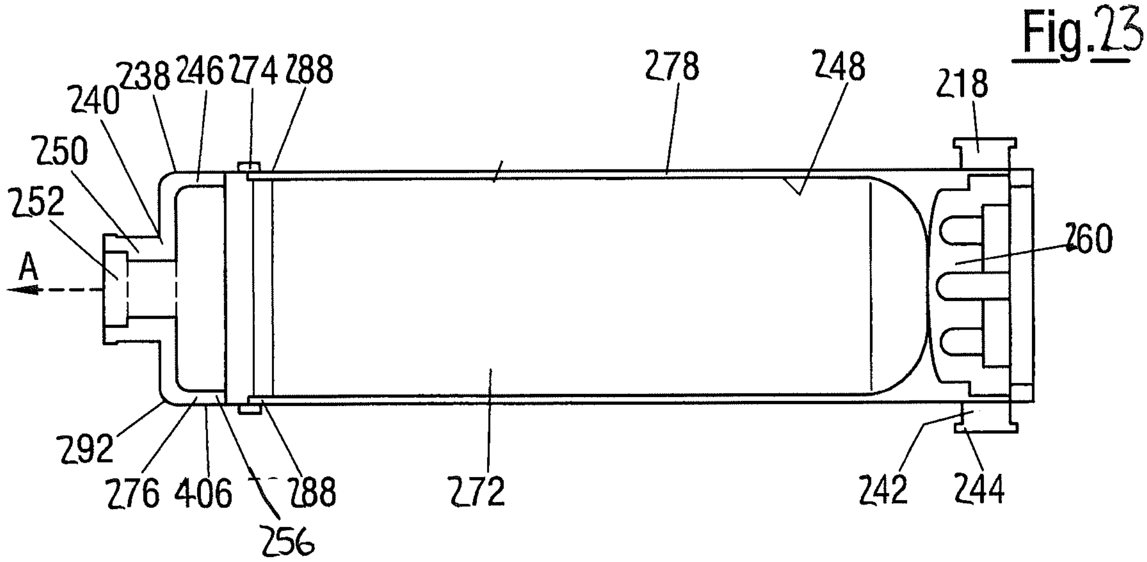
FIG. 23 is sectional view of a further cartridge assembly.

Similarly, one or more crimps 288 can be disposed at an inner surface 290 of the sleeve 202. Specifically, with sleeves 200 as shown in FIGS. 21 to 23 it can be beneficial to have such crimps 288 present in the vicinity of the threaded connection 274, in particular arranged at the inner surface 290 of the sleeve 202 at the same position at which the outer thread 282 is provided. By way of such crimps 288 one can avoid the piston 204 from falling out of the sleeve 202 at the positions of the threaded connection 274.

Likewise crimps 288 can be disposed at the inner surface 290 of the sleeve 202 at an axial height of the radial pins 218. In this way one can avoid the piston 204 from dropping out the back end 236 of the sleeve 202.

FIG. 22 shows a sectional view of the further cartridge assembly 200 of FIG. 21, with a screw cap 292 removed from the sleeve 202. On assembly of the cartridge assembly 200, the cartridge 10 is inserted in the rear part 278 and the film bag 12 is received within the sleeve 202, thereafter the screw cap 292 is screwed over the head part 14 and to the rear part 278 to form the cartridge assembly 200.

In this connection it should be noted that the front part 276 of the sleeve can have a length selected in the range of 0 to 20 cm, in particular in the range of 0 to 5 cm and especially in the range of 0.5 to 2.5 cm. In this connection it should be noted that 0 cm is the case for a flat front end with a threaded part only.

It should further be noted that the front part 276 of the sleeve can have a thickness selected in the range of 0.05 to 7 mm, in particular in the range of 0.25 to 3 mm and especially in the range of 0.2 to 3 mm, in regions where there is no part of the joint, such as the threaded connection 274.

In this connection it should be noted that the rear part 278 of the sleeve can have a length selected in the range of 5 to 50 cm, in particular in the range of 10 to 40 cm and especially in the range of 12 to 20 cm.

It should further be noted that the rear part 278 of the sleeve can have a thickness selected in the range of 0.05 to 7 mm, in particular in the range of 0.25 to 3 mm and especially in the range of 0.5 to 32.5 mm, in regions where there is no part of the joint, such as the threaded connection 274.

Figure 24:
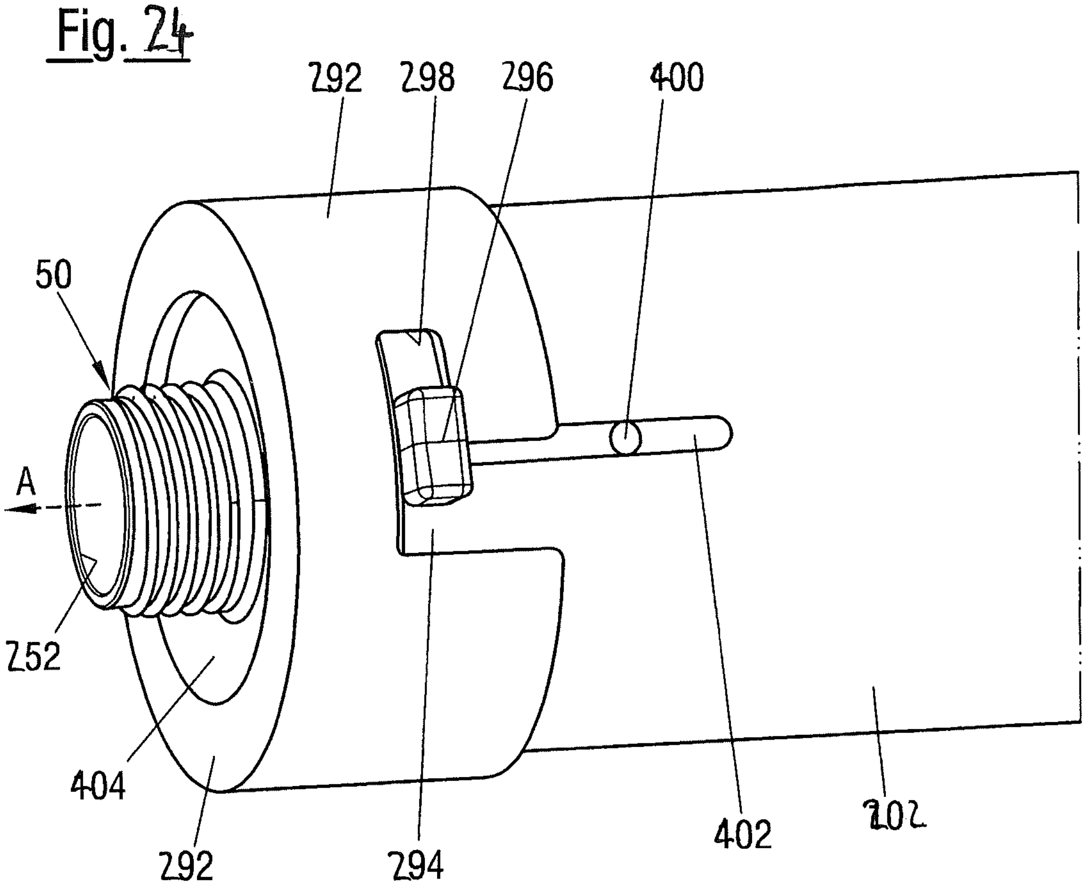
FIG. 24 is a perspective view of a further cartridge assembly.

FIG. 24 shows a perspective view of a further cartridge assembly 200. Rather than using the screw cap 292, the cap is provided with a quick release fastener. This quick release fastener is present in the form of a bayonet closure, where radial pins 296 project from the sleeve 202 and cooperate with corresponding slots 298 present at the cap 292.

In this way the cap 292 can have a quick release fastener present thereat which cooperates with a corresponding member present at the sleeve 202 in order to reliably and quickly connect the cap 292 to the sleeve 202 in order to captively hold the head part 14 of the cartridge 10 at the sleeve 202.

The outer surface of the sleeve comprises a component 294 present thereat with the radially outwardly extending pins 296 projecting from the separate component 294. The separate component 294 can be formed from the same or a different material as the sleeve 202. The separate component 94 is directly connected to the outer surface of the sleeve 202.

In a non-shown design the pins 296 can be formed directly at the outer surface of the sleeve 202 from the same material as the sleeve 202 or from a different material than the material of the sleeve 202 and then project radially outwardly from the sleeve 202.

It should also be noted that the pins can be provided at the cap 292 and mate with two or more slots (not shown) present at the sleeve 202, in this instance the pins would then project radially inwardly.

Figure 25:
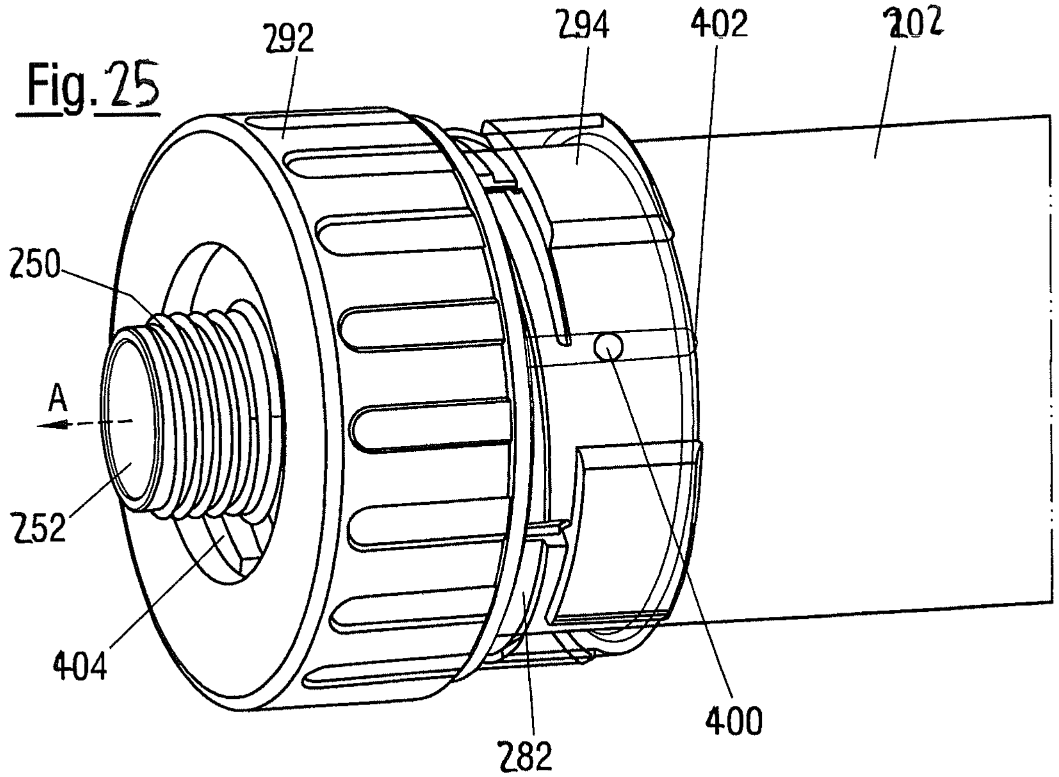
FIG. 25 is a perspective view of yet a further cartridge assembly.

FIG. 25 shows a perspective view of yet a further cartridge assembly 200. In this instance a screw cap 292 is used but this is fastened to the separate component 294 which then has an outer thread 282 present at an outer surface thereof. The separate component 294 is then directly connected to the outer surface of the sleeve 202. The separate component 294 shown in FIG. 25 can also be formed from the same or a different material as the sleeve 202 of FIG. 25.

In this connection it should be noted that a seal can be present between the sleeve and the cap and/or the screw cap in order to provide a barrier at this point of connection between the sleeve 202 and the cap 292 shown in the FIGS. 21 to 25. Such sealing elements can be required, if a gas driven dispenser is used to drive the material out of the cartridge, either directly or indirectly via the piston 204.

In this connection it should be noted that if a gas driven dispenser is used then the sleeve 202 can also comprise sealing elements (not shown) at its back end 236, in order to allow a pressure chamber to be formed within the sleeve 202.

In this connection it should further be noted that the connectors, i.e. the outer thread, slots and/or radial pins, optionally present at the outer surface of the sleeve 202 as shown in FIGS. 24 and 25 are provided at the component 294 that is separate from the sleeve 202.

The component separate 294 from the sleeve 202 if used can then be press fit and/or friction fit and/or snap fit and/or adhesively bonded, and/or welded into place at the sleeve 202 in the form of an outer sleeve or ring. The component 294 separate from the sleeve 202 then cooperates directly with the cap 292 and the sleeve 202. In the designs shown in FIGS. 21 to 23, the cap 292 interacts directly with the sleeve 202.

The use of such separate components 292 can become necessary for manufacturing reasons, but a single piece sleeve 202 having the connectors directly present thereat is also highly desirable for certain applications.

As also indicated in FIGS. 24 and 25 the sleeve 202 can comprise one or more through bores and/or apertures 400 at a pre-defined axial height (not shown). These apertures 400 can be provided if the dispenser 300 is a gas driven dispenser 300 in which the piston 204 is moved by gas and not by a push rod. These apertures 400 then prevent the piston 204 from moving too far axially forward in the direction of the head part 14 beyond a pre-defined position, i.e. to prevent the piston 204 from getting stuck at the head part 14 and/or the front end 238 of the sleeve and/or from even dropping out the end of the front end 238 of the sleeve 202. This is because the apertures 400 are designed to release the pressure present in the sleeve 202 at this pre-defined position.

On the outer surface of the sleeve 202 there can be one or more recesses 102 which connect with the one or more apertures 400 in order to ensure a connection between the apertures 400 and the atmosphere.

Generally speaking the piston 204 has an outer shape that is formed complementary to an inner shape of the head part 14. This is done to ensure as much of the material stored in the respective cartridge 10 as possible can be dispensed from the cartridge 10.

In this connection it should be noted that the head part 14 of the cartridges 10 shown in FIGS. 16 to 22 each have a dome-shaped outer shape. This shape is mirrored in the dome shaped front ends 238 of the respective sleeve 202. The piston 204 consequently also has a dome-shaped outer shape that is formed complementary to the inner and the outer shape of the head part 14.

FIG. 23 shows a sectional view of a further cartridge assembly 200. The difference to the examples shown in the foregoing is that the front end 238 of the sleeve 202 like the head part 14 has an at least substantially flat shape from which the outlet 250 projects. Like the example shown in FIGS. 21 and 22 the sleeve 202 is a two-part sleeve, with the front and rear parts 276, 278 being connected via the threaded connection 274.

Regarding the designs with a dome shaped outer and a flat shaped outer shape, both have end faces 404 with the end faces 404 being covered by the part of the sleeve.

As indicated in FIGS. 23 to 25 the end face 404 having the flat shaped outer shape is directly adjoined by a sidewall 406 extending between the end face 104 and the collar 256.

The outlet 250 can project from the end face 404 of the dome shaped outer shape or the flat shaped outer shape respectively.

In a non-illustrated design the sleeve 202 can comprise bayonet type slots at its front end 238 which mate with radial pins provided at the sidewall 404 of the head part, so that the head part 14 directly locks into the sleeve 202 via this bayonet type of connection. In this instance the sleeve 202 then covers the sidewall 406 of the head part 14.

In all of the embodiments shown the sleeve 202 comprises a part that covers a part of the head part 14 in order to captively hold the front end 238 of the sleeve 202 on dispensing materials from the cartridge assembly. This becomes necessary as the dispenser depicted in FIGS. 15 and 19 does not comprise a cartridge receptacle in which the front end 238 of the cartridge 10 is held. Rather the cartridge assembly 200 is only held at the dispenser via the pins 218 interacting with the slots 220. In this connection it should be noted that the part of the sleeve 202 that covers the head part can cover between 10 to 80%, in particular 25 to 65%, of the head part 14. In particular it should be noted that the part of the sleeve 202 that covers the head part 14 can cover between 10 to 80%, in particular 25 to 65%, of the end face 404 of the head part 14.

In this connection it should be noted that the end face 404 is that part of the head part 14 that projects away from the film bag cartridge 12 along the longitudinal axis A and that is remote from any material stored in the cartridge 10 when the cartridge 10 is not in use.

In this connection it should be noted that a maximum outer diameter of the outlet 250 can be selected in the range of 6 to 25 mm. Depending on the specific outer maximum diameter of the outlet 250, an inner diameter of the aperture 240 is selected larger than this maximum diameter such that the outlet 250 can pass through the aperture 240. The aperture can have a minimum inner diameter selected in the range of 10 to 30 mm, preferably wherein the aperture 240 has an inner diameter that is selected 30 to 300% (i.e. 1.3 to 3 times as large) larger than a maximum outer diameter of the outlet 250.

In order to assemble the system comprising the cartridge 10 and the dispenser 300, the following steps have to be carried out:

providing the film bag cartridge 12;

inserting the film bag cartridge 12 into the sleeve 202 and contacting the head part 14 of the film bag cartridge 12 to the part of the sleeve 202 covering the solid head part 14 to form a cartridge assembly 200;

aligning the one or more radial pins 218 of the cartridge assembly 200 with one or more slots 220 of the dispenser 300;

moving the cartridge assembly 200 along the longitudinal axis A of the cartridge assembly 200 towards the dispenser 300; and rotating the one or more radial pins 218 in the one or more slots 220 to fix the cartridge assembly 200 to the dispenser 300.

The disclosure further describes the following embodiments:

The disclosure relates to a foil cartridge according to a first embodiment Tillable with at least one fluid and composed of a film bag cartridge forming a cartridge sleeve and a solid head part, wherein the head part comprises at least one outlet opening for dispensing the fluid out of the foil cartridge and at least one external thread for attaching the foil cartridge to a support sleeve, wherein the film bag cartridge is attached to the head part in the area of the external thread.

According to embodiment 2 that can include all features of embodiment 1 the film bag cartridge can be attached to an outer side of the head part.

According to embodiment 3 that can include some or all features of embodiments 1 and 2, the film bag cartridge is attached to the head part such that the film bag cartridge covers the external thread, respectively being tightly fit to the external thread in a form-fitting manner.

According to embodiment 4 that can include all features of embodiment 1, the film bag cartridge is attached to an inner side of the head part.

According to embodiment 5 that can include some or all features of the preceding embodiments, the film bag cartridge is glued to the head part.

According to embodiment 6 that can include some or all features of embodiments 1 to 4, the head part is molded on to the film bag cartridge.

According to embodiment 7 that can include some or all features of the preceding embodiments, the film bag cartridge comprises at least one coating on its inner and/or outer side.

According to embodiment 8 that can include some or all features of the preceding embodiments, the film bag cartridge consists of at least two layers, i.e. an inner and an outer layer.

According to embodiment 9 the at least two layers can be made out of different materials.

According to embodiment 10 each layer can further comprise a width in the range of 4 to 100 μm.

According to embodiment 11 that can include some or all features of embodiments 8 to 10, the at least two layers comprise different widths.

According to embodiment 12 that can include some or all features of embodiments 8 to 11, wherein at least one of the layers comprises aluminium.

According to embodiment 13 that can include some or all features of embodiments 8 to 12, the at least two layers are connected to one another by at least one composite film.

According to embodiment 14 that can include some or all features of embodiments 8 to 13, the film bag cartridge comprises a third layer arranged between the inner layer and the outer layer.

According to embodiment 15 that can include some or all features of embodiment 14, the third layer comprises aluminium.

According to embodiment 16 that can include some or all features of embodiments 8 to 15, the film bag cartridge comprises another layer arranged between the inner layer and the outer layer, comprising Ethylene vinyl alcohol copolymer (EVOH).

According to embodiment 17 that can include some or all features of embodiments 8 to 16, the outer layer of the film bag cartridge is made out of the same material as the solid head part.

According to embodiment 18 that can include some or all features of embodiments 8 to 17, the inner layer of the film bag cartridge comprises a plastic, in particular a thermoplastic.

According to embodiment 19 that can include some or all features of embodiments 8 to 18, the inner layer of the film bag cartridge comprises the same material as the solid head part.

According to embodiment 20 that can include some or all features of embodiment 19, the inner layer and the outer layer of the film bag cartridge comprise the same material as the solid head part.

According to embodiment 21 that can include some or all features of embodiments 8 to 20, the inner layer is made of the same material as a part of the solid head part that is brought into connection with the film bag cartridge.

According to embodiment 22 that can include some or all features of embodiments 8 to 21, the inner layer comprises a Shore D hardness in the range of 40 to 99.

According to embodiment 23 that can include some or all features of embodiments 8 to 22, the inner layer of the film bag cartridge is made of polyethylene, polypropylene, polyamide, polyethylene terephthalate or polybutylene terephthalate.

According to embodiment 24 that can include some or all features of embodiments 8 to 23, the outer layer of the film bag cartridge comprises a plastic.

According to embodiment 25 that can include all features of embodiment 24, the outer layer comprises a thermoplastic.

According to embodiment 26 that can include some or all features of embodiments 8 to 25, the outer layer comprises a shore D hardness in the range of 40 to 99.

According to embodiment 27 that can include some or all features of embodiments 8 to 26, the outer layer of the film bag cartridge is made of polyethylene, polypropylene, polyamide, polyethylene terephthalate or polybutylene terephthalate.

According to embodiment 28 that can include some or all features of the preceding embodiments, the solid head part comprises a plastic.

According to embodiment 29 that can include all features of embodiment 28, the solid head part comprises a thermoplastic.

According to embodiment 30 that can include some or all features of the preceding embodiments, the solid head part comprises a Shore D hardness in the range of 40 to 99.

According to embodiment 31 that can include some or all features of the preceding embodiments, the head part is made of polyethylene, polypropylene, polyamide, polyethylene terephthalate or polybutylene terephthalate According to embodiment 32 that can include some or all features of the preceding embodiments, the solid head part is made of a polyethylene of high density (HDPE), wherein the polyethylene of high density comprises a density in the range of 930 $kg/m^3$ to 970 $kg/m^3$.

According to embodiment 33 that can include some or all features of the preceding embodiments, the film bag cartridge is closed by a weld seam at a rear end remote from the solid head part.

According to embodiment 34 that can include some or all features of the preceding embodiments, the film bag cartridge is closed by a clip at a rear end remote from the solid head part.

According to embodiment 35 that can include some or all features of the preceding embodiments, the film bag cartridge is closed by an adhesive at a rear end remote from the solid head part.

According to embodiment 36 that can include some or all features of the preceding embodiments, the film bag cartridge is stiff in a pulling direction.

According to embodiment 37 that can include some or all features of the preceding embodiments, the film bag cartridge is configured to withstand a tensile load of 50N to 80N in an axial direction.

According to embodiment 38 that can include some or all features of the preceding embodiments, the film bag cartridge comprises a puncture resistance in the range of 10 to 20 N.

According to embodiment 39 that can include some or all features of embodiments 8 to 38, the width of the inner layer is greater than the width of the outer layer.

According to embodiment 40 that can include some or all features of embodiments 8 to 39, the inner layer comprises a minimal width 50 μm to 90 μm.

According to embodiment 41 that can include some or all features of the preceding embodiments, the film bag cartridge comprises a total material width in the range of 80 μm to 150 μm and/or a total weight per unit area in the range of 100 $g/m^2$ to 170 $g/m^2$.

According to embodiment 42 that can include some or all features of the preceding embodiments, the film bag cartridge comprises a maximum water vapor permeation of 0.3 $g/(m^2 \times d)$.

According to embodiment 43 that can include some or all features of the preceding embodiments, the film bag cartridge comprises a maximum water vapor permeation of 0.2 $g/(m^2 \times d)$.

According to embodiment 44 that can include some or all features of the preceding embodiments, the film bag cartridge comprises a maximum oxygen permeation of 0.3 $cm^3/(m^2 \times bar \times d)$.

According to embodiment 45 that can include some or all features of the preceding embodiments, the film bag cartridge comprises a maximum oxygen permeation of 0.2 $cm^3/(m^2 \times bar \times d)$.

According to embodiment 46 that can include some or all features of the preceding embodiments, the film bag cartridge comprises a wall thickness of at least 60 μm.

According to embodiment 47 that can include some or all features of embodiments 8 to 46, each layer of the film bag cartridge comprises a width of at least 4 μm, in particular of at least 5 μm.

According to embodiment 48 that can include some or all features of embodiments 8 to 46, a bonding agent is arranged between at least two layers of the film bag cartridge, wherein the two layers are made of different materials.

According to embodiment 49 that can include all features of embodiment 48, the bonding agent comprises a layer width in the range of 1 μm to 5 μm.

According to embodiment 50 that can include some or all features of the preceding embodiments, the film bag cartridge comprises an essentially cylindrical outer shape and/or wherein the film bag cartridge comprises a weld seam in an axial direction.

According to embodiment 51 that can include all features of embodiment 50, the weld seam is designed as a sealed edge seam or an overlap seam.

According to embodiment 52 that can include some or all features of embodiments 8 to 51, the outer layer of the film bag cartridge is flatly connected to an inner wall of the head part.

According to embodiment 53 that can include some or all features of the preceding embodiments, the film bag cartridge comprises a volume in the range of 50 ml to 750 ml.

According to embodiment 54 that can include some or all features of embodiments 1 to 52, the film bag cartridge comprises a volume in the range of 750 ml to 5000 ml, in particular 1000 ml, 1250 ml, 2500 ml or 4000 ml.

According to embodiment 55 that can include some or all features of the preceding embodiments, the solid head part comprises one of more stiffening ribs at a side facing away from the film bag cartridge.

According to embodiment 56 that can include all features of embodiment 55, the one or more stiffening ribs are arranged in a circumferential direction.

According to embodiment 57 that can include some or all features of embodiment 55 or 56, the stiffening ribs extend in a radial direction starting from a center axis of the film bag cartridge.

According to embodiment 58 that can include some or all features of the preceding embodiments, wherein the head part is essentially dome-shaped, with in particular the stiffening ribs being arranged on the dome.

According to embodiment 59 that can include some or all features of the preceding embodiments, the head part comprises at least one wing.

According to embodiment 60 that can include all features of embodiment 59, the at least one wing is arranged on the dome.

According to embodiment 61 that can include some or all features of embodiment 59 or 60, the wing is bigger than at least one of the one or more stiffening ribs.

According to embodiment 62 that can include some or all features of embodiments 59 to 61, the wing comprises a height that is bigger than a height of at least one of the one or more stiffening ribs.

According to embodiment 63 that can include some or all features of embodiments 59 to 62, the wing comprises essentially the same width, in particular exactly the same width, as the one or more stiffening ribs.

According to embodiment 64 that can include some or all features of the preceding embodiments, the head part comprises a web area arranged in a circumferential direction, which extends over a front end of the film bag cartridge facing the head part.

According to embodiment 65 that can include some or all features of the preceding embodiments, the outlet opening of the head part comprises an essentially constant cross section.

According to embodiment 66 that can include some or all features of the preceding embodiments, the outlet opening comprises an inner thread to which an outlet nozzle can be attached to.

According to embodiment 67 that can include some or all features of the preceding embodiments, the outlet opening comprises an outer thread to which an outlet nozzle can be attached to.

According to embodiment 68 that can include some or all features of the preceding embodiments, the outlet opening is closed by a membrane when the film bag cartridge is filled, with the membrane in particular being pierceable by the outlet nozzle.

According to embodiment 69 that can include some or all features of embodiments 58 to 67, the outlet opening is arranged at a side of the dome of the head part facing away from the film bag cartridge.

According to embodiment 70 that can include some or all features of the preceding embodiments, the head part comprises an outlet area at which the outlet opening is arranged and which extends along the central axis of the film bag cartridge.

According to embodiment 71 that can include all features of embodiment 70, the outlet area comprises an essentially tubular shape and comprises at least in some areas a wall thickness in the range of 0.5 mm to 1.5 mm.

According to embodiment 72 that can include some or all features of embodiment 70 and 71, the outlet area comprises a length in the range of 5 mm to 40 mm.

The invention further relates to a support sleeve for holding and/or supporting a foil cartridge according to one of the preceding embodiments, wherein the support sleeve comprises an inner thread which corresponds with the outer thread of the foil cartridge.

According to embodiment 2 that can include all features of embodiment 1, the support sleeve is made of metal, in particular aluminium, and/or plastic.

According to embodiment 3 that can include some or all features of the preceding embodiments, the support sleeve is a single piece.

According to embodiment 4 that can include some or all features of embodiment 1 and 2, the support sleeve is made of several parts.

According to embodiment 5 that can include all features of embodiment 4, the support sleeve comprises at least one, in particular several, connection points to connect the different parts of the support sleeve to one another.

According to embodiment 6 that can include all features of embodiment 5, the at least one connection point is designed as a thread, as a bayonet connection or as a click lock.

According to embodiment 7 that can include some or all features of the preceding embodiments, the support sleeve comprises an inner sleeve and an outer sleeve.

According to embodiment 8 that can include some or all features of embodiment 7, the inner sleeve is movably, in particular slidably, arranged inside the outer sleeve.

According to embodiment 9 that can include some or all features of the preceding embodiments, the inner thread is a multi-start, in particular a two-start, thread.

The invention further relates to a cartridge system with at least one foil cartridge according to at least one of the preceding embodiments, a support sleeve according to at least one of the preceding embodiments and a piston, wherein the piston and the foil cartridge are arranged in a receiving area of the support sleeve, and wherein the foil cartridge is screwed via its outer thread to the inner thread of the support sleeve such that a part of the support sleeve covers a part of the head part of the foil cartridge, wherein the support sleeve comprises at least one radial pin, which is arranged at an end of the support sleeve remote to the head part for connecting the support sleeve to a dispenser.

According to embodiment 2 that can include all features of embodiment 1, the at least one radial pin is mushroom-shaped.

According to embodiment 3 that can include some or all features of embodiments 1 and 2, the radial pin is configured to cooperate with corresponding counter parts, in particular recesses, at the dispenser such that the support sleeve is fastened, in particular releasably fastened, to the dispenser.

What is claimed:

1. A foil cartridge fillable with a fluid, comprising:
a film bag cartridge forming a cartridge sleeve; and
a solid head part comprising at least one outlet opening to dispense the fluid out of the foil cartridge and an external thread to attach the foil cartridge to a support sleeve, the film bag cartridge attached to the head part in an area of the external thread, the film bag cartridge attached to the head part such that the film bag cartridge covers the external thread, and is tightly fit to the external thread in a form-fitting manner.

2. The foil cartridge according to claim 1,
wherein the head part is molded on to the film bag cartridge.

3. The foil cartridge according to claim 1,
wherein the film bag cartridge includes an inner and an outer layer.

4. The foil cartridge according to claim 3,
wherein the inner and outer layers are connected to one another by at least one composite film.

5. The foil cartridge according claim 3,
wherein the outer layer of the film bag cartridge is a same material as the solid head part.

6. The foil cartridge according to claim 3,
wherein the inner layer of the film bag cartridge comprises a same material as the solid head part.

7. The foil cartridge according to claim 1,
wherein the solid head part comprises a Shore D hardness in a range of 40 to 99.

8. The foil cartridge according to claim 1,
wherein the film bag cartridge is configured to withstand a tensile load of 50N to 80N in an axial direction.

9. The foil cartridge according to claim 1,
wherein the film bag cartridge comprises a puncture resistance in a range of 10 to 20 N.

10. The foil cartridge according to claim 1,
wherein the film bag cartridge comprises an essentially cylindrical outer shape or the film bag cartridge comprises a weld seam in an axial direction.

11. The foil cartridge according to claim 1,
wherein the solid head part comprises one of more stiffening ribs at a side facing away from the film bag cartridge.

12. The foil cartridge according to claim 1,
wherein the head part is essentially dome-shaped.

13. The foil cartridge according to claim 12,
wherein the solid head part comprises a stiffening rib at a side facing away from the film bag cartridge, and the stiffening ribs are arranged on the dome.

14. The foil cartridge according to claim 1,
wherein the head part comprises a wing.

15. The foil cartridge according to claim 14,
wherein the solid head part comprises a stiffening rib at a side facing away from the film bag cartridge, the wing is bigger than the stiffening rib.

16. The foil cartridge according to claim 1,
wherein the head part comprises a web area arranged in a circumferential direction, the circumferential direction extending over a front end of the film bag cartridge facing the head part.

17. The foil cartridge according to claim 1,
wherein the outlet opening is closed by a membrane when the film bag cartridge is filled, with the membrane being pierceable by an outlet nozzle.

18. A support sleeve comprising:
an inner thread which corresponds with an outer thread of a foil cartridge, and being configured to hold and support a foil cartridge fillable with a liquid, the foil cartridge comprising a film bag cartridge forming a cartridge sleeve, and a solid head part comprising at least one outlet opening to dispense the fluid out of the foil cartridge and an external thread to attach the foil cartridge to a support sleeve, the film bag cartridge attached to the head part in an area of the external thread, the film bag cartridge attached to the head part such that the film bag cartridge covers the external thread, and is tightly fit to the external thread in a form-fitting manner.

19. A cartridge system, comprising:

a foil cartridge fillable with a liquid, the foil cartridge comprising a film bag cartridge forming a cartridge sleeve, and a solid head part comprising at least one outlet opening to dispense the fluid out of the foil cartridge and an external thread to attach the foil cartridge to a support sleeve, the film bag cartridge attached to the head part in an area of the external thread;

a support sleeve holding or supporting the foil cartridge, the support sleeve comprising an inner thread which corresponds with an outer thread of the foil cartridge; and a piston, the piston and the foil cartridge arranged in a receiving area of the support sleeve, and the foil cartridge is screwed via an outer thread to the inner thread of the support sleeve such that a part of the support sleeve covers a part of the head part of the foil cartridge, the support sleeve comprising a radial pin, arranged at an end of the support sleeve remote to the head part to connect the support sleeve to a dispenser.

* * * * *